(12) United States Patent
Chivers

(10) Patent No.: US 6,215,555 B1
(45) Date of Patent: Apr. 10, 2001

(54) METHOD AND APPARATUS FOR MEASURING ENDFACE SURFACE TOPOGRAPHY OF MULTI-FIBER FIBEROPTIC CONNECTORS

(75) Inventor: James T. Chivers, Phoenix, AZ (US)

(73) Assignee: Direct Optical Research Company, Phoenix, AZ (US)

(*) Notice: Subject to any disclaimer, the term of this patent is extended or adjusted under 35 U.S.C. 154(b) by 0 days.

(21) Appl. No.: 09/227,550

(22) Filed: Jan. 7, 1999

(51) Int. Cl.[7] ....................................................... G01B 9/02
(52) U.S. Cl. ........................ 356/450; 356/73.1; 356/511
(58) Field of Search .................................. 356/73.1, 345, 356/352, 357, 358, 450, 511, 513, 514

(56) References Cited

U.S. PATENT DOCUMENTS 5,459,564 * 10/1995 Chivers ................................ 356/73.1
5,636,020 * 6/1997 Csipkes et al. ...................... 356/345

OTHER PUBLICATIONS

NTT–AT, MT Fiberoptic Connectors, NTT Advanced Technology Corporation.
One–Touch Detachable Multi–Core Optical Connector, NTT Advanced Technology Corporation, MPO Fiberoptic Connector Design and Assembly Technique, pp. 1–2.

* cited by examiner

Primary Examiner—Frank G. Font
Assistant Examiner—Andrew H. Lee
(74) Attorney, Agent, or Firm—Cahill, Sutton & Thomas P.L.C.

(57) ABSTRACT

A system for evaluating a connector end surface of a multi-fiber fiberoptic connector having a precision guide pin hole for receiving a guide pin to precisely mate the connector with a like connector includes a reference guide pin having a polished flat reference surface oriented at a predetermined angle relative to a longitudinal axis of the reference guide pin. The reference guide pin is inserted into the guide pin hole. In one embodiment, an interferometer is first focused onto the connector end surface. The connector end surface is tipped and tilted to minimize or establish a viable fringe density on the connector end surface. The interferometer then acquires the interferogram data and produces an uncalibrated profile of the connector end surface. The interferometer then is focused on the reference surface and acquires its interferogram data, and then computes a profile of the reference surface. The profiles of the connector end surface and the reference surface are combined to provide a calibrated profile of the connector end surface. In another embodiment, the interferometer is focused on the reference guide pin first. The connector end surface then is tipped and tilted to establish a predetermined number of fringes thereon. The interferometer then profiles the connector end surface, which, because of the tipping and tilting, is calibrated relative to the guide pin hole.

38 Claims, 20 Drawing Sheets

Excessive Undercut

Excessive Angle

Excessive Protrusion

Radius Too Small

METHOD AND APPARATUS FOR MEASURING ENDFACE SURFACE TOPOGRAPHY OF MULTI-FIBER FIBEROPTIC CONNECTORS

CROSS REFERENCE TO RELATED APPLICATION

This application claims the benefit of prior filed co-pending U.S. Provisional Application Ser. No. 60/088, 905, filed Jun. 11, 1998, entitled "METHOD AND APPARATUS TO MORE ACCURATELY MEASURE THE ENDFACE SURFACE TOPOGRAPHY OF "MT" AND "MPO" STYLE FIBEROPTIC CONNECTORS" by Jamie T. Chivers, appended hereto as Appendix 1.

BACKGROUND OF THE INVENTION

The invention relates to fiberoptic connectors, and more particularly to methods and apparatus for reliably testing multi-fiber fiberoptic connectors to ensure that all fiber ends are properly aligned with, and in physical end-to-end contact with, corresponding fiber ends in a mating fiberoptic connector.

The MT (Mechanically Transferable) connector shown in FIG. 1 and MPO (Multi-path Push On) connector shown in FIGS. 2A and 2B originally developed by NTT in Japan, have been deployed primarily in Japan for several years. The advantageous technical features and price/performance ratios of MT and MPO connectors have meant that this non-traditional style of fiberoptic connector is gradually becoming more widely accepted, and is becoming quite widely used in both the U.S. and other worldwide markets. The main advantages of MT and MPO connectors are high optical fiber density (typically 2–12 fibers), small physical size, and low cost. A variant of the MT connector is the MT-RJ connector, which has a smaller design that fits within the footprint of a standard 8 pin modular telephone jack, and is being considered as one of the main contenders by the standards organizations for fiberoptic premise network wiring.

This type of fiberoptic connector has extremely critical dimensional tolerances that must be maintained to ensure acceptable performance and "intermatability" of connectors. As these connectors (the MT, MPO, and MT-RJ) become more widely used in single-mode applications, their geometric tolerances are expected to become even tighter. As fiberoptic cable bandwidth requirements increase, the fiberoptic connectors can become one of the most critical components affecting the overall system performance of a fiberoptic transmission system.

An optical fiber 1 shown in FIG. 4 typically is constructed in three distinct concentric layers, including a 250 micron diameter acrylic jacket 2 which coats the outside of the glass optical fiber. The jacket's main function is to provide basic environmental protection to the glass optical fiber. Without this jacket, just brushing the fiber over another surface could score the glass, leading to a crack which eventually would propagate through the glass, fracturing the fiber and rendering it inoperable. Since the acrylic coating can be colored, it also provides a useful method of fiber identification. The second layer is a 125 micron diameter cladding 3. This has become the standard outer diameter for all but the most unusual and application specific fiber designs. The purpose of the cladding is to contain the light within the 8 micron fiber core 4, using the principal known as "total internal reflection". The secondary purpose of the cladding 3 is to increase the fiber diameter to a level that provides it sufficient mechanical strength, can be fairly easily seen and can be manipulated by human hands. The core is the part of the fiber that carries the light. The core 4 and the cladding 3 constitute one contiguous piece of glass; however, they have different refractive indexes to keep the light within the core. Multi-mode fibers have a typical core diameter of 62.5 microns, as opposed to the 8 micron core diameter typically used in single-mode fibers.

Although the core of a single-mode fiber is much smaller than that of a multi-mode fiber, allowing only a single "mode" to propagate from the input to the output of the fiber dramatically increases the amount of data or "bandwidth" offered by single-mode fibers, when compared to multi-mode fibers. With the rapidly increasing demand for voice, video, and Internet communications, bandwidth can be a scarce and valuable resource. As such, most new long distance fiber deployment is single-mode. Even when using sophisticated multiplexing techniques, the maximum bandwidth capacity of a single fiber may be used up, and there is no other option than to add additional fibers to increase communication capacity. As the number of single fibers being added to a bundle increases, so does the diameter of the cable necessary to contain and protect them. Not only is this expensive, but it can also create problems in already crowded ducts and passages used to route cables. Therefore, manufacturers are looking for ways to achieve smaller physical size, higher performance, more manageable, and less expensive systems, and have begun to manufacture "ribbon fibers". A ribbon fiber as shown in FIG. 5 includes a number of optical fibers (typically 2–12) laid side by side and sleeved with an additional outer coating. This technique provides very high fiber densities, while having the added advantage that installation and maintenance workers are able to handle up to 12 or more fibers at one time.

Fiber preparation can be a very labor intensive and expensive part of terminating or joining fibers together. Having the ability to work on multiple fibers at one time using specialized tools has led to dramatic time and cost savings in optical fiber installation and maintenance for ribbon fiberoptic cable users.

Optical fiber multiplexing and transmitter and receiver technology have made such great technological advances that data transfer rates of the order of Terabytes per second over a "perfect" optical fiber link have been demonstrated, using a combination of various multiplexing and data compression technologies. As a result, engineers and scientists now face the difficult task of simplifying system implementation (without losing performance) to a level such that workers with little experience, crawling down through manhole covers in harsh environments, can be reasonably expected to install and maintain such ribbon fiber links with a high degree of success and reliability.

One of the most important and frequently overlooked factors involved when installing a fiberoptic transmission system is the proper installation and use of fiberoptic connectors. When it is necessary to join or patch two ribbon cables together, there are two primary choices: fusion of optical fibers and use of optical fiber connectors. Fusion involves accurately cleaving all of the fibers to the same length across the ribbon on the two cables to be joined, and then using a specialized machine known as a ribbon fusion splicer, which brings all of the fiber pairs together very accurately along the X,Y and Z axes. An electrical arc applied with a small compressive force pressing the cleaved surfaces together then is used to physically fuse the individual fiber pairs together as one contiguous fiber. This process, when performed properly, and after the application of additional splice protection, can join two multi-fiber ribbon cables together almost as effectively as if they were manufactured as a contiguous piece of fiber. For permanent joints, fusion splicing provides the most economical and robust solution to joining optical fibers.

On the other hand, there are many situations where a permanent joint is not desired, not required, or not feasible, in which case connectors become the only viable alternative technique for joining the fibers. Examples of such applications would include (1) patch panels where reconfiguring of fiber routes may be necessary, and (2) attachment to system or test equipment and applications such as high speed optical back-planes which require automatic connection and disconnection of the optical path as circuit boards are inserted and removed. At the user level "consumers" expect multi-fiber fiberoptic connectors to work in the same way as electrical connectors, that is, the fiberoptic connectors are simply "plugged in" for a pair of MPO or a pair of MT connectors, and everything works. In reality, a great deal of sophisticated technology and precision engineering has to occur to make this happen.

It is important to recognize that the performance of optical connectors can have a dramatic impact on the overall performance, integrity and reliability of an entire optical link. The main "enemies" of an optical signal at a connectorization point are "loss" and "back-reflection". Since the core diameter of a single-mode fiber is only 8 microns, when connecting two fibers together using a connector, a lateral misalignment smaller than 1 micron can cause significant optical power loss at the connector interface. This uses some of the loss "budget", and therefore reduces the distance through which the light can continue to propagate before regeneration or optical amplification is required to maintain the data integrity of the signal. One cause of back-reflection occurs in a connector when two mating fiber ends do not achieve physical contact with each other, creating a small air gap in the transmission path of the signal, and causing "back-reflections" of the laser light from the unmatched interface. Such spurious reflections can affect the stability of the transmission equipment and greatly degrade the useable bandwidth of the fiberoptic transmission system.

Both high loss and high back-reflection are common problems associated with poorly terminated connectors. Loss is most often caused by either a defective ferrule not maintaining stringent lateral tolerances for fiber alignment, a lack of physical contact between two fiber end faces (due to fiber recess or poor endface geometry), or surface imperfections/contamination on one or both of the fiber endfaces. Back reflection most often is caused by fiber recesses in the connector endface or poor endface geometry wherein the connector's ferrules physically come into contact with each other before the mating fiber ends can physically contact each other. This results in back-reflection caused as the laser wave-front hits the silica/air interface of the discontinuous fiber path. Additionally, high fiber endface surface roughness can also increase both back-reflection and loss.

With conventional single fiber connectors, it is relatively easy using modern processes to assure the necessary physical contact between two inter-mating fibers, simply by spherically polishing the ends of each ferrule containing the fiber. By controlling factors such as the radius of curvature, fiber height and apex offset of the polish with respect to the center of the fiber, physical contact between the fibers can be assured, thereby minimizing loss and back reflection. For further explanation, see my U.S. Pat. No. 5,459,564 entitled "Apparatus and Method for Inspecting End Faces of Optical Fibers and Optical Fiber Connectors", issued Oct. 17, 1995, incorporated herein by reference.

For MT and MPO connectors as shown in FIGS. 1 and 2, the problem of maintaining physical contact simultaneously between all 2–12 fibers becomes significantly more difficult to achieve consistently than for a single fiber connector. Since a truly spherical polish can only have one apex, and can thus only resolve the physical contact problem for one fiber, manufactures have had to resort to alternative methods to solve the problem. A common method is to use a polishing process that leaves the fibers very slightly protruding above the ferrules "flat" or "angled flat" endface surface for MT and MPO connectors, respectively.

It should be appreciated that there is a very small difference between leaving enough protruding fiber to ensure physical contact of all fibers, and the alternatives which would be either (1) to leave too much protruding fiber, thereby damaging the fragile fibers when two connectors are mated, or (2) to leave the fibers recessed below the ferrules surface, thereby eliminating any possibility of physical contact.

Another popular polishing technique that has evolved involves polishing the rectangular upper endface 35A of the MT connector 35 (or MPO connector 350) much like the bowed or elongated convex shape found on the top of a long loaf of bread, e.g. as indicated in FIG. 8. The idea is that the centerline 10 of the transverse axis of the connector which contains the row of fiber ends 1 would be slightly higher than the surrounding perimeter of endface 35A, thereby encouraging physical contact. It should be noted that the difference between adequate physical contact of the fiber ends and none at all is only a few microns. Therefore, having an accurate measurement of the surface topography of the connector endface, including the fiber ends, is essential to predicting the performance of all types of multi-fiber connectors.

MT and MPO fiberoptic connectors have a significantly larger endface area of interest than single-fiber connectors do, not only because they contain more fibers, but also because the polish of the connector endface more closely resembles a flat or angled flat surface than a sphere. Thus, the first point of contact between the endfaces of the two ferrules encapsulating the fibers could fall anywhere across a relatively large surface. This first point of contact (with respect to the fiber heights) determines the magnitude of any possible separation or gap between the ends of the corresponding fibers of the mated connectors, and ultimately determines the overall performance of the connector. Until the present invention, there has been no way to determine the location or height of the above-mentioned first point of contact.

To further explain the foregoing difficulty in determining the first point of contact, FIGS. 10A and 10B show a precisely coupled pair of MT connectors 35 and 35-1. All of the corresponding fiber ends extending from the endfaces of connectors 35 and 35-1 are precisely aligned and in perfect end-to-end physical contact so that there is minimal light loss or back-reflection. In contrast, FIGS. 11A–D show some of the various forms of defective end-to-end connector couplings that can occur as a result of imperfect connector endface profiles. FIG. 11A shows a connection where the endface 35A of lower connector 35 has excessive fiber "undercut", preventing any of the ends of any of the corresponding fibers 1 and 1—1 from achieving physical contact. FIG. 11B shows a connection where the endface 35A of lower connector 35 is at an excessive angle relative to a plane perpendicular to the longitudinal axis of guide pin holes 40, whereby the first point of ferrule endface contact prevents the ends of some of the corresponding fibers 1 and 1—1 from achieving physical contact, resulting in both loss and back-reflection. FIG. 11C shows a connection where lower connector 35 has excessive protrusion of fibers 1 above endface 35A, causing the fibers 1 to bend as shown as a result of end abutment forces. Such endfaces result in stress, bending, poor coupling and potential fiber damage. FIG. 11D shows a connection where the radius of curvature of endface 35A of lower connector 35 is too small; the result is that the outermost pairs of corresponding fibers 1 and 1—1 fail to achieve physical contact, which causes harmful loss and back-reflections in those fibers.

To determine the presence of the conditions shown in FIGS. 11A–D, it is necessary to obtain the surface topography profiles of the connector endfaces 35A and 35A-1 and the fiber ends 1 and 1-1 protruding therefrom, using interferometric measurements. Despite the many advantages of the MT and MPO connectors, their design inherently creates many difficulties for interferometric measurement. A first difficulty is that the region of interest on an MT or an MPO connector can be as large as 6.4×2.5 millimeters, in contrast to a diameter of only approximately 250 microns (i.e., 0.25 millimeters) being required for a standard single fiber connector. Simply reducing the magnification of the interferometer to view the entire surface is not acceptable, as too much resolution is lost by doing this. Consequently, most manufacturers have independently chosen a "trade-off" magnification, trying to optimize the trade-off between field of view and resolution. Consequently, using the prior art techniques, multiple interferometric measurements of the separate continuous areas of endface of an MT or MPO connector must be made and "pasted" together to build up the required view of the endface surface topography.

A second difficulty is that the material chosen by manufacturers for MT and MPO connectors primarily has been a black epoxy, filled with silica particles. When polished, the resulting endface often looks like "silica islands in a sea of epoxy", as indicated by numeral 9 in FIG. 14, which shows the endface of a typical MT or MPO connector. Good interferometric data representing the surface profile of the endface of an MT or MPO connector often is available only from the highly reflective silica islands. Therefore, it is quite a complex operation to paste all of the captured regions together in three dimensions. Since the good data is situated on such islands 9 as shown in FIG. 12, it becomes necessary to perform broad-band interferometry on MT and MPO connectors, because otherwise it is impossible to know the height relationship of the good data regions with respect to each other. Unfortunately, broad-band interferometry generally is much slower than narrow-band interferometry.

A third difficulty can be understood by comparison to the calibration of conventional single fiber connectors, wherein the precision cylindrical ferrule can be rotated in the interferometer fixture. By watching the interferogram, or alternatively by measuring the apex offset at different rotational orientations, it is possible to verify and compensate for any misalignment between the connector fixture and the interferometers optical axis. Since single fiber connectors use a precision split sleeve to couple two connectors, the endface geometry measurement can be considered to be calibrated because the same surfaces are referenced to measure the endface geometry in the interferometer as are used to locate the ferrule in an actual mating of a pair of joined connectors. In contrast, this is not the case for MT and MPO connectors wherein two precision "guide pins" slide into precision aligned mating holes 40 in a pair of MT or MPO connectors being joined instead of using locating features on the outsides of the ferrules to join a pair of the connectors together. Because the mating reference surface of an MT or MPO connector is not on the outside of the ferrule, and more importantly, because the ferrule cannot be rotated (since it is rectangular), it has not been possible to achieve an accurate calibration of the surface to be measured by the interferometer to obtain a calibrated profile of the connector endface and fiber ends which need to be aligned with and brought into physical contact with ends of corresponding fibers of a mating MT or MPO connector.

As stated earlier, the first point of contact determines the overall performance of a fiberoptic connector. Without an accurate calibration of the measured connector endface data this first point of contact cannot be determined, making any surface topography test data far less useful in judging whether the multi-fiber fiberoptic connector should be accepted, re-worked, or discarded.

Thus, there is an unmet need for a technique and apparatus for providing a profile of a multi-fiber fiberoptic connector endface which is precisely calibrated with respect to a feature of the connector that aligns it to mate with a like multi-fiber fiberoptic connector.

SUMMARY OF THE INVENTION

Accordingly, it is an object of the invention to provide an apparatus and technique for providing a calibrated profile of a multi-fiber fiberoptic connector such as an MT connector or an MPO connector, which profile identifies the point of initial contact between the endface of the multi-fiber fiberoptic connector with the endface of a "like", but theoretically perfect, mating fiberoptic connector.

It is another object of the invention to provide a method and apparatus for precisely evaluating the intermatability of multi-fiber fiberoptic connectors.

It is another object of the invention to provide a technique for profiling endfaces of multi-fiber fiberoptic connectors so as to predict which connectors may cause loss and back reflection.

It is another object of the invention to provide an improved method and apparatus for testing multi-fiber fiberoptic connectors.

Briefly described, one embodiment of the invention provides a "first" embodiment for evaluating a connector end surface of a multi-fiber connector having a precision guide pin hole for receiving a guide pin to precisely mate the multi-fiber connector with a like multi-fiber connector by providing a reference guide pin having on one end thereof a polished flat reference surface oriented at a predetermined angle relative to the longitudinal axis of the reference guide pin. The reference guide pin is inserted a predetermined depth into the guide pin hole. An interferometer then focuses on the reference surface. The relative orientation between the reference surface and a reference mirror of the interferometer is adjusted to produce a predetermined fringe density of an interferogram on the reference surface. The interferometer then is focused on the connector end surface and the interferometer is operated to acquire data representative of the interferogram on the connector end surface. The interferometer is operated to compute from the data a profile of the connector end surface, wherein the profile is precisely calibrated with reference to the guide pin hole (or holes), whereby the profile of the connector end surface is indicative of intermatability of the multi-fiber connector with the "like", but theoretically perfect, multi-fiber connector. The predetermined angle can be a right angle, for use in conjunction with an MT connector. Alternatively, the predetermined angle can be 8 degrees, for use in conjunction with an MPO connector, in which case the rotational orientation of the reference guide pin about its longitudinal axis must be established such that the angled 8 degree surface is approximately parallel to the end surface of the MPO connector.

In a "second" embodiment of the invention, which is especially useful if the "first" embodiment results in an unacceptably high fringe density on the connector end surface, a reference guide pin having on one end thereof a polished flat reference surface oriented at a predetermined angle relative to the longitudinal axis of the reference guide pin is inserted into the guide pin hole. An interferometer then is focused on the connector end surface. The relative orientation between the connector end surface and a reference mirror of the interferometer is adjusted to produce a predetermined fringe density of an interferogram on the connector end surface. The interferometer then is operated to acquire data from the interferogram on the connector end surface. The interferometer then is operated to produce from that data an uncalibrated profile of the connector end surface. The interferometer then is focused on the reference surface if nessary and operated to acquire data representative of an interferogram on the reference surface, and the interferometer is operated to compute from that data a profile of the reference surface. The interferometer then is operated to combine the profiles of the connector end surface and the reference surface to precisely calibrate the connector end surface relative to the guide pin hole to provide a calibrated profile of the connector end surface, whereby the calibrated profile of the connector end surface is indicative of mateability of the multi-fiber connector with the like multi-fiber connector. The predetermined angle can be a right angle, for use in conjunction with an MT connector. Alternatively, the predetermined angle can be 8 degrees, for use in conjunction with an MPO connector, in which case the rotational orientation of the reference guide pin about its longitudinal axis must be established such that the angled 8 degree surface is approximately parallel to the end surface of the MPO connector.

DETAILED DESCRIPTION OF THE PREFERRED EMBODIMENTS

Figure 13A:
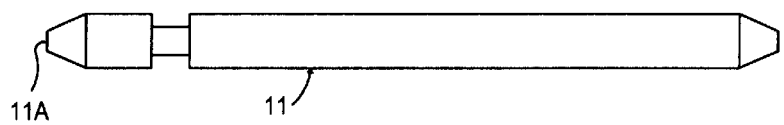
FIG. 13A is a plan view of a standard guide pin used to align a pair of MT connectors or a pair of MPO connectors as they are mated.

To obtain an accurate rather than relative measurement of the endface of an MT or MPO connector, the invention provides several possible techniques for calibration of surface topography data interferometrically acquired from the endface of a multi-fiber fiberoptic connector such as an MT or MPO connector. Each method uses at least one reference guide pin to achieve accurate calibration of the interferometrically measured profile of the connector endface relative to the guide pin holes 40 (e.g., see FIG. 16A) by means of which mated connectors are aligned. It is important to note that the novel "reference guide pins" of the present invention having precisely flat polished right angled endfaces are used when working with MT connectors, and precisely polished "angled flat" endfaces are used for MPO connectors. Referring to FIG. 13A, the standard cylindrical guide pin 11 commonly used to perform the optical alignment during joining or mating of a pair of MT connectors or a pair of MPO connectors has an endface 11A which is not polished or toleranced.

Figure 13B:
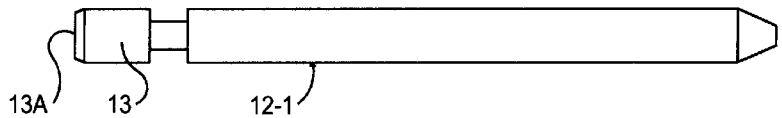
FIG. 13B is a plan view of a reference guide pin for aiding interferometric profiling of the endface of an MT connector.
Figure 13C:
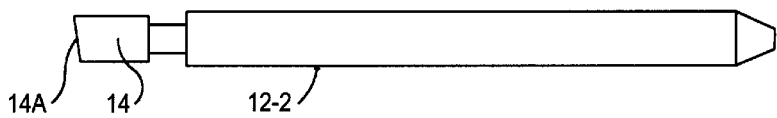
FIG. 13C is a plan view of a reference guide pin for aiding in interferometric profiling of the endface of an MPO connector.

A "reference" guide pin 12-1 according to the present invention is shown in FIG. 13B, and is used when interferometrically measuring endfaces of MT connectors, wherein the endface 13A on head 13 of reference guide pin 12-1 is precisely flat, precisely polished, and oriented at a right angle to the longitudinal axis of reference guide pin 12-1. What is meant by a "recisely polished" surface is simply a smooth, flat, or angled flat highly reflective surface. A reference guide pin 12-2 shown in FIG. 13C is used when interferometrically profiling the endface of an MPO connector. The endface 14A of head 14 of reference guide pin 12-2 is precisely flat, precisely polished, and usually is oriented at an angle of 8 degrees from a plane perpendicular to the longitudinal axis of reference guide pin 12-2.

In accordance with the invention, the above mentioned standard guide pins 11 of FIG. 13A are used to align a pair of properly, precisely manufactured MT fiberoptic connectors or a pair of properly, precisely manufactured MPO fiberoptic connectors. The diameter, straightness and surface finish of both the guide pins and guide pin holes are held to extremely tight tolerances so as to achieve sub-micron lateral and angular repeatability in the alignment of mated MT connectors and mated MPO connectors.

The close piston fit between the guide pins 11 and the guide pin holes 40 in MT connectors 35 and MPO connectors 350 makes standard guide pins 11 ideal for modification according to the present invention to provide polished endfaces 13A and 14A of reference guide pins 12-1 and 12-2, respectively; the reference guide pin endfaces 13A and 14A are suitable for use as reference surfaces when measuring MT and MPO connectors, respectively. Such a close fit between reference guide pin 12-1 or 12-2 and hole 40 (FIG. 16A) results in very stable and repeatable fringe patterns on the endfaces 13A or 14A of the reference guide pins during interferometric measurement.

The endface of a standard guide pin 11 can be modified to have either an extremely precise "flat" polish or an "angled flat" polish produced on its previously un-toleranced endface to obtain reference guide pins 12-1 and 12-2, respectively. Referring to FIG. 13A, numeral 11A designates the previously untoleranced endface of a standard guide pin 11 before such modification. FIG. 13B shows the "reference guide pin" 12-1 having a head 13 with a precisely "flat" polished endface 13A perpendicular to the longitudinal axis of reference guide pin 12-1, which is used for profiling endfaces of MT connectors. FIG. 13C shows a reference guide pin 12-2 with a head 14 having a precisely "angled flat" polished endface 14A, and is used for profiling endfaces of MPO connectors. FIG. 13C also shows one possible configuration of a keying feature 14B of reference guide pin 12-2 to accurately control the rotational orientation (about the longitudinal axis of guide pin 12-2) of its angled endface 14A when reference guide pin 12-2 is inserted into the guide pin hole 40 of an MPO connector. Such keying feature 14B also can be used on a reference guide pin 12-1 to allow the rotational orientation of a guide pin suitable for profiling the endfaces of MT connectors to be controlled. Such rotational control can yield even more accurate calibration of MT style connectors.

Note that it is possible, although not preferable, to use any known surface configuration on the endfaces of the reference guide pins including, but not limited to angled, spherical and parabolic shapes, as all such variants could perform essentially the same tip/tilt calibration function.

A "first method" and associated apparatus according to the present invention are more suitable for manual interferometer systems, where the interferogram needs to truly represent the surface topography or profile of the fiberoptic connector under test such that an operator controlled interferometer system can quickly identify the first point of contact with a theoretically precisely flat endface of a mating fiberoptic connector, and also can interpret the overall shape or profile of the connector endface.

Figure 13D:
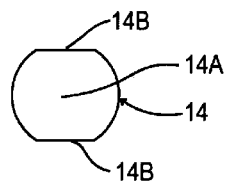
FIG. 13D is a partial left end view of FIG. 13C illustrating a keying feature.

Referring to FIG. 13B, one example of the first method involves providing reference guide pin 12-1 such that its endface 13A is polished precisely flat at a right angle with respect to the longitudinal axis of reference guide pin 12-1. Such reference guide pin 12-1 is inserted into one end of a guide pin hole 40 of an MT connector 35 as shown in FIG. 16A, using a special reference guide pin insertion/removal tool 20 shown in FIGS. 14A, 14B, 15A, and 15B to set the insertion depth of the reference guide pins 12-1. (Optionally, insertion/removal tool 20 can be used to also precisely align the rotational orientation of the reference guide pin 12-1 about its longitudinal axis, as subsequently explained with reference to FIGS. 13C, 13D, and 17.)

Note that another example of the "first method" would be to perform the foregoing procedure using a reference guide pin 12-2 and an MPO connector 350.

Figure 14A:
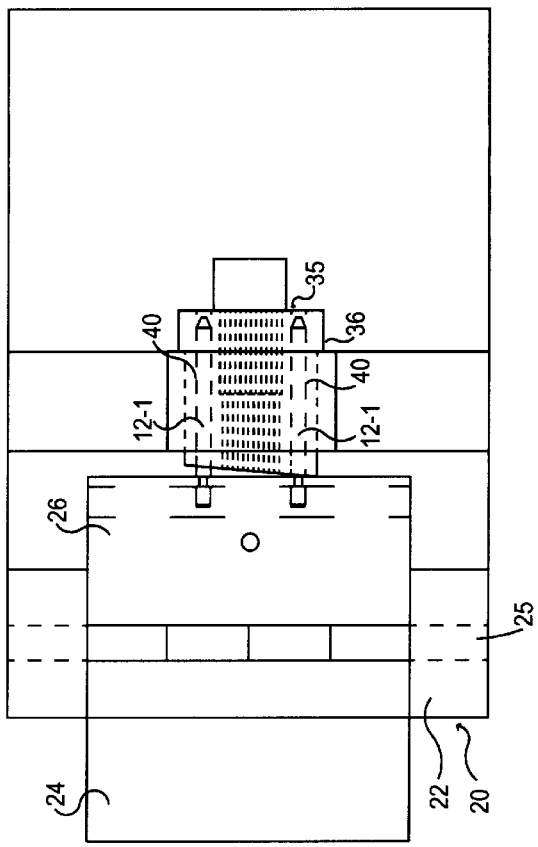
FIG. 14A is a plan view of a tool for loading and unloading reference guide pins into and from guide pin holes of MT and MPO connectors.
Figure 14B:
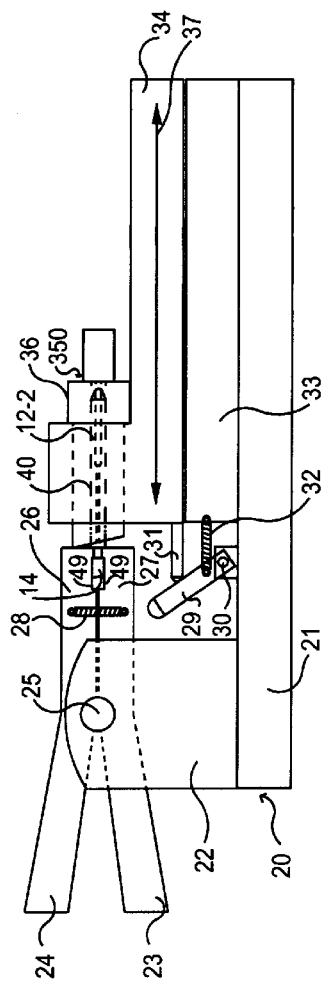
FIG. 14B is a side elevational view of the tool of FIG. 14A.

Referring to FIGS. 14A and 14B, insertion/removal tool 20 includes a stationary base 21 including a pair of spaced uprights 22 supporting a pivot rod 25. A pair of handle/jaw elements 23 and 24 are supported on pivot rod 25 as shown, with semi-cylindrical bearing surfaces that mate with the outer surface of pivot rod 25. One or more tension springs 28 urge the upper handle/jaw element 24 and the lower handle/jaw element 23 together on the right-hand side of pivot rod 25. Handle/jaw element 24 includes a jaw 26 having a semi-cylindrical recess 49 therein which matches the head 13 or 14 of a reference guide pin 12-1 or 12-2, respectively, which is to be securely held therein. Similarly, lower handle/jaw member 23 includes a like recess 49.

A slidable carriage 34 moves on a stationary track 33 attached to base 21 in the directions of arrows 37, and carries an MT or MPO connector 35 or 350, as shown in FIGS. 14A and 14B, respectively, so that guide pin hole 40 is precisely aligned with recesses 49 of jaws 26 and 27. As shown in FIG. 14A, jaws 26 and 27 include two recesses 49, to allow one or two reference guide pins to be inserted into the two guide pin holes 40 of the MT connector 35 (or MPO connector 350). Pivotal stop 29 in FIG. 14B establishes the elevation of jaw 27 in its closed position. Element 31 is rigidly attached to carriage 34, and displaces pivotal stop 29 as shown in FIG. 14B when carriage 34 is at its left-most location to allow jaws 26 and 27 to be opened as shown in FIG. 15C to release the "captive" reference guide pin.

Figure 15A:
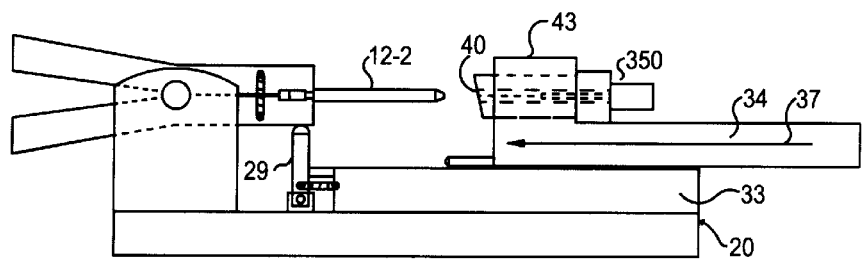
FIGS. 15A–C show a sequence of operations using the tool shown in FIG. 14B to load the reference guide pins of FIG. 14B into guide pin holes of an MPO connector.
Figure 15B:
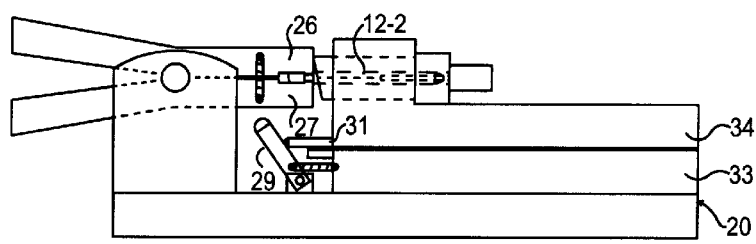
Figure 15C:
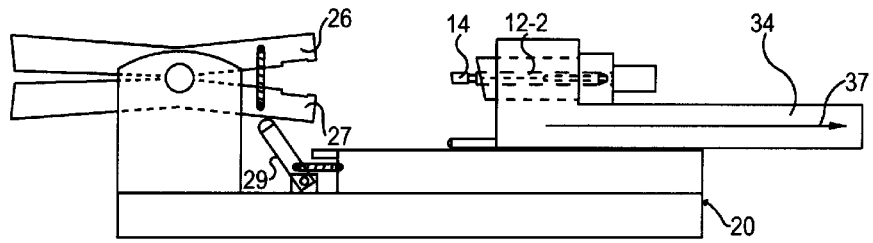

An example of the sequence of steps using insertion/removal tool 20 to "load" reference guide pin(s) 12-2 into an MPO connector 350 for interferometric profiling of connector endface 350A is shown in FIGS. 15A-C. When carriage 34 moves on carriage track 33 in the direction of arrow 37 in FIG. 15A so that one or two reference guide pins 12-2 held by insertion/removal tool 20 are inserted into guide pin hole(s) 40 of MPO connector 350, pivotal stop 29 is moved from the position shown in FIG. 15A to the position shown in FIG. 15B to allow jaws 26 and 27 to be opened later as shown in FIG. 15C. In FIG. 15B the left-most point of connector 350 abuts the endface of upper jaw 26, to limit the depth to which pins 12-2 are inserted into guide pin holes 40. In FIG. 15C, arrow 37 illustrates movement of carriage 37 and MPO connector 350 with reference pin(s) 12-2 inserted after jaws 26 and 27 are opened to release the head 14 of reference guide pin 12-2.

Figure 16B:
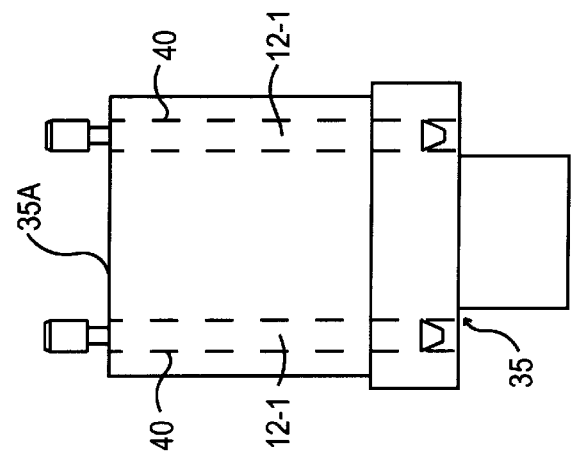
FIG. 16B is another diagram useful in explaining the first method of interferometric profiling of the endface of the MT connector of FIG. 16A.
Figure 16A:
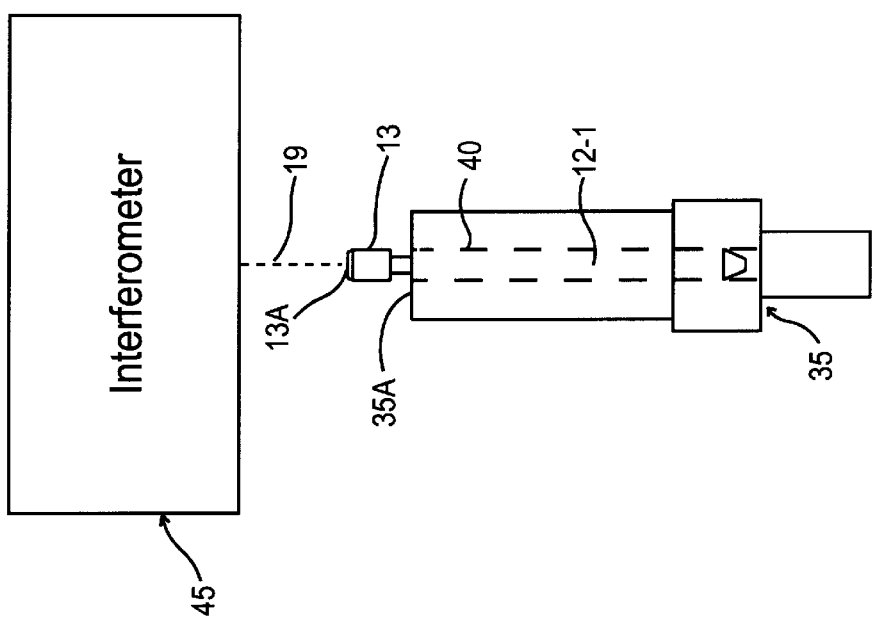
FIG. 16A is a diagram useful in explaining a first method of interferometric profiling of the endface of an MT connector.
Figure 16C:
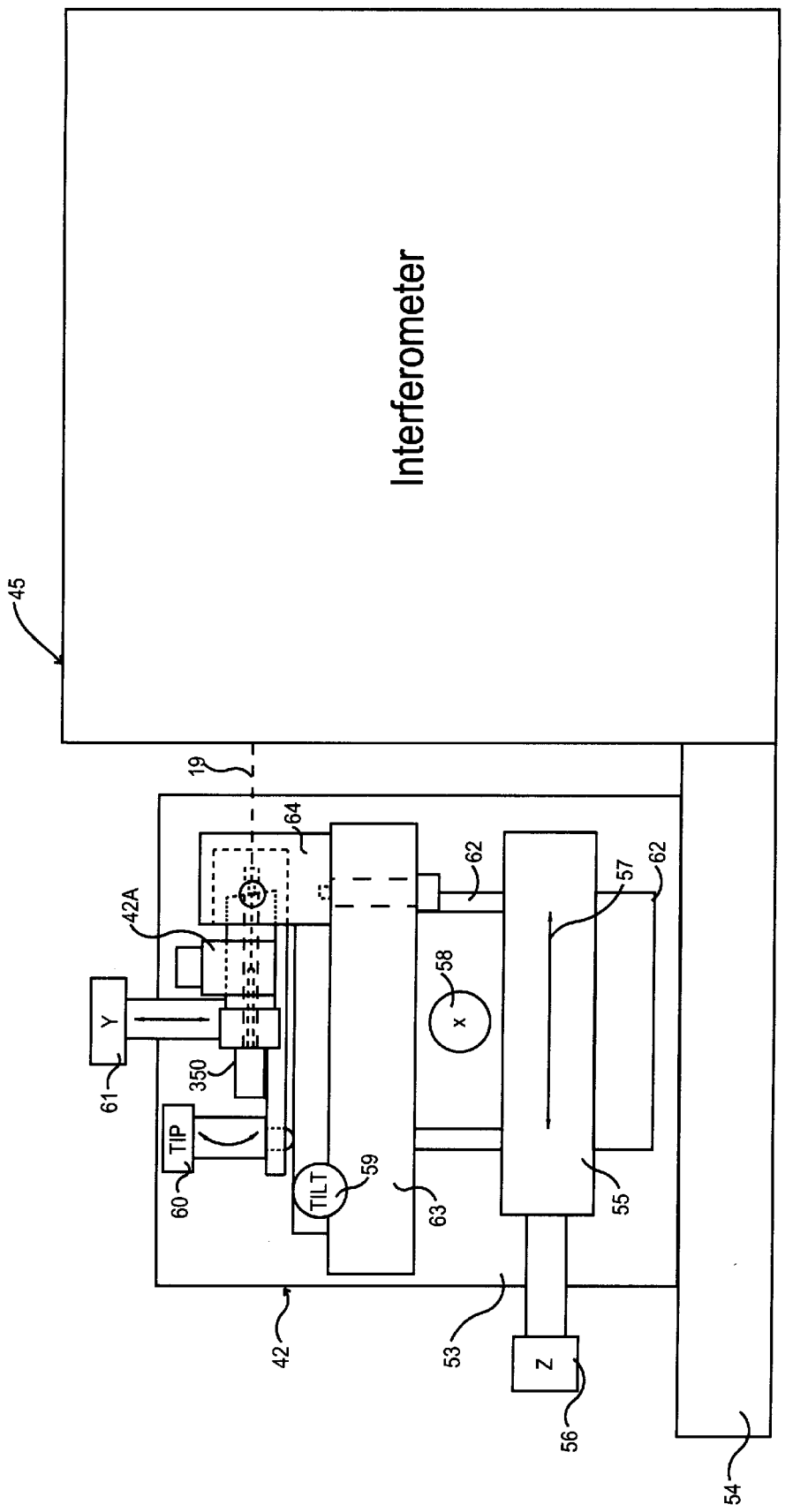
FIG. 16C is an elevation view diagram showing the clamping mechanism 42A, and adjustment mechanism 42 which positions an MT or MPO connector in the field of view of an interferometer and provides precise adjustment of the connector in the X, Y, or Z axes and about the tip and tilt axes.
Figure 16D:
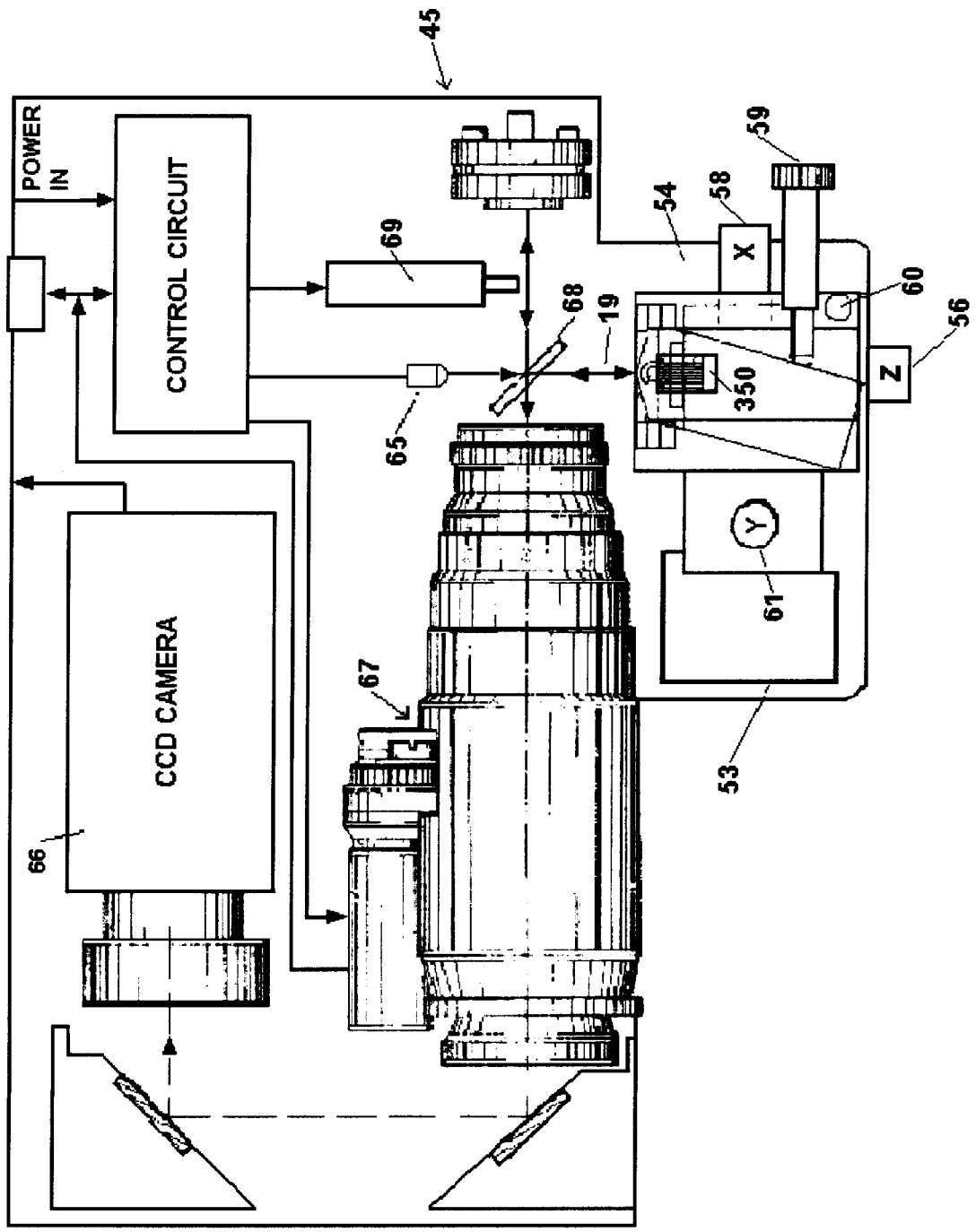
FIG. 16D is a plan view diagram of the arrangement shown in FIG. 16C.

MPO connector 350 or MT connector 35 with reference guide pin 12-2 inserted is then removed from carriage 34 and secured on an XYZ tip and tilt stage 42 of interferometer 45 as shown in FIGS. 16C and 16D so the procedure for profiling the reference pin endface and connector endface can be carried out, as subsequently described. After connector 350 or 35 has been "calibrated" and profiled according to the present invention, connector 350 is again affixed to carriage 34, and the foregoing procedure is reversed to "unload" reference guide pins 12-2 back into jaws 26 and 27 as shown FIG. 15A, where the reference guide pins are held to be loaded into the next connector.

Figure 1:
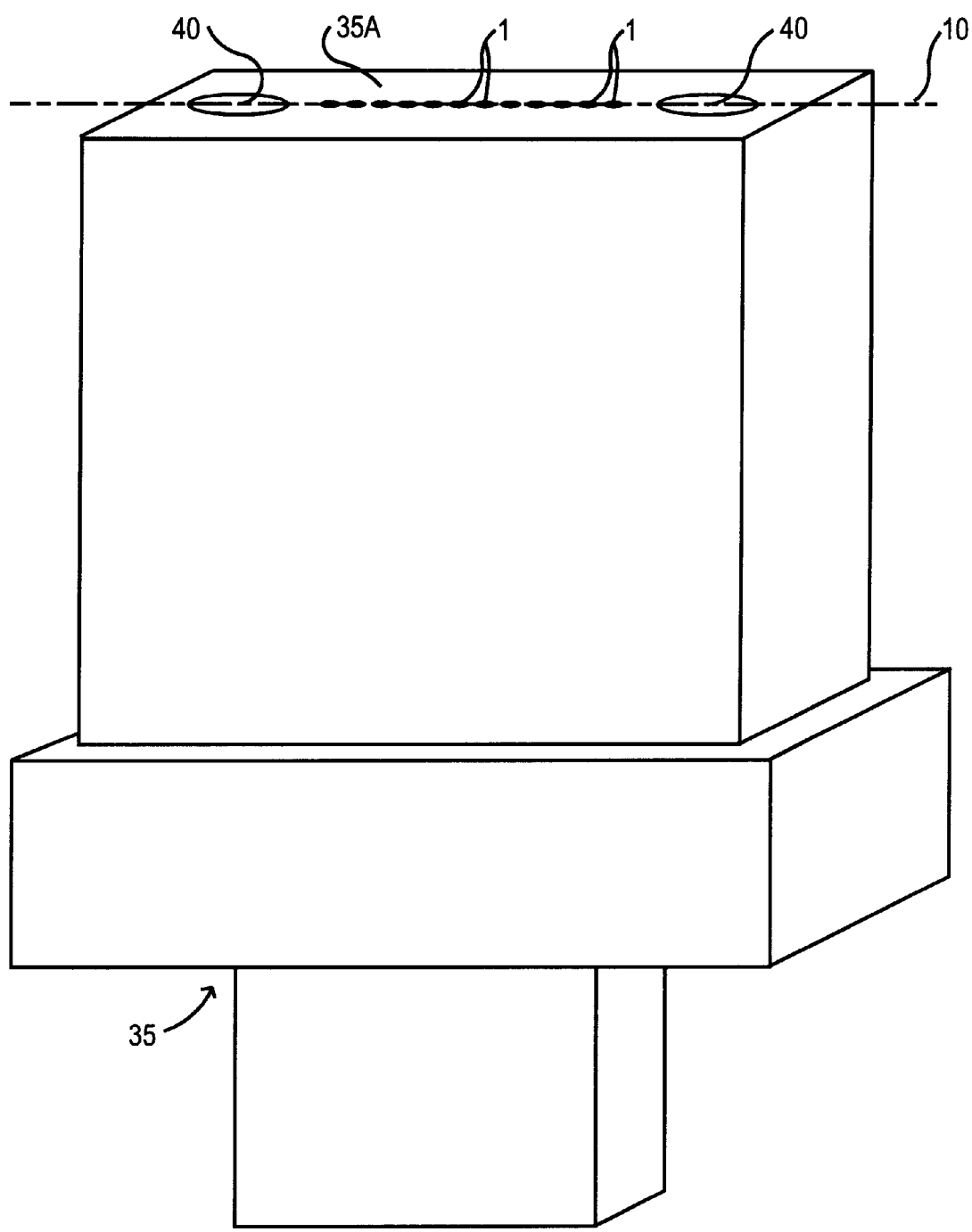
FIG. 1 is a perspective view of an MT fiberoptic connector.
Figure 2B:
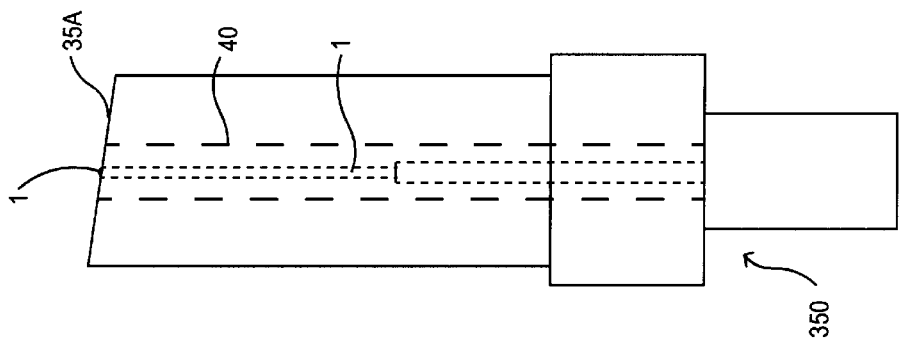
FIG. 2B is a side elevational view of the MPO fiberoptic connector of FIG. 2A.
Figure 2A:
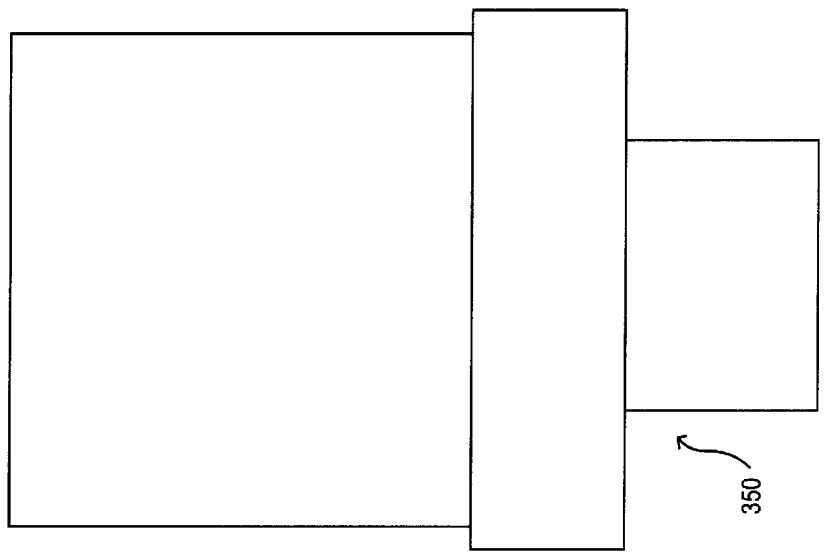
FIG. 2A is a front elevational view of an MPO fiberoptic connector.
Figure 3:
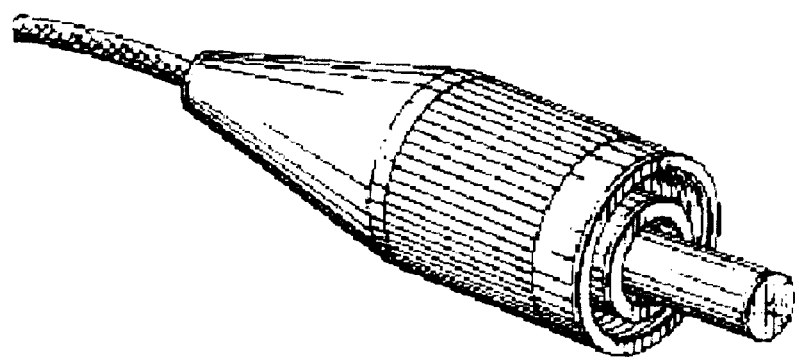
FIG. 3 is a perspective view of a conventional "single fiber" fiberoptic connector.
Figure 4:
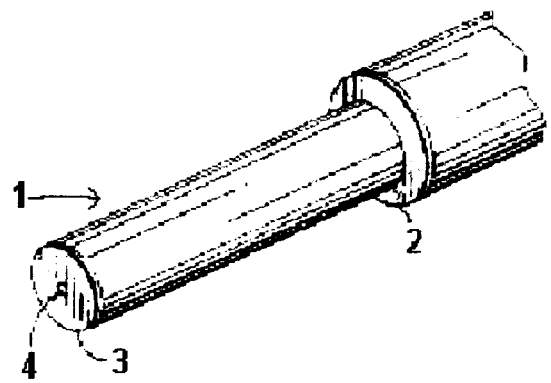
FIG. 4 is a perspective view of a single optical fiber.
Figure 5:
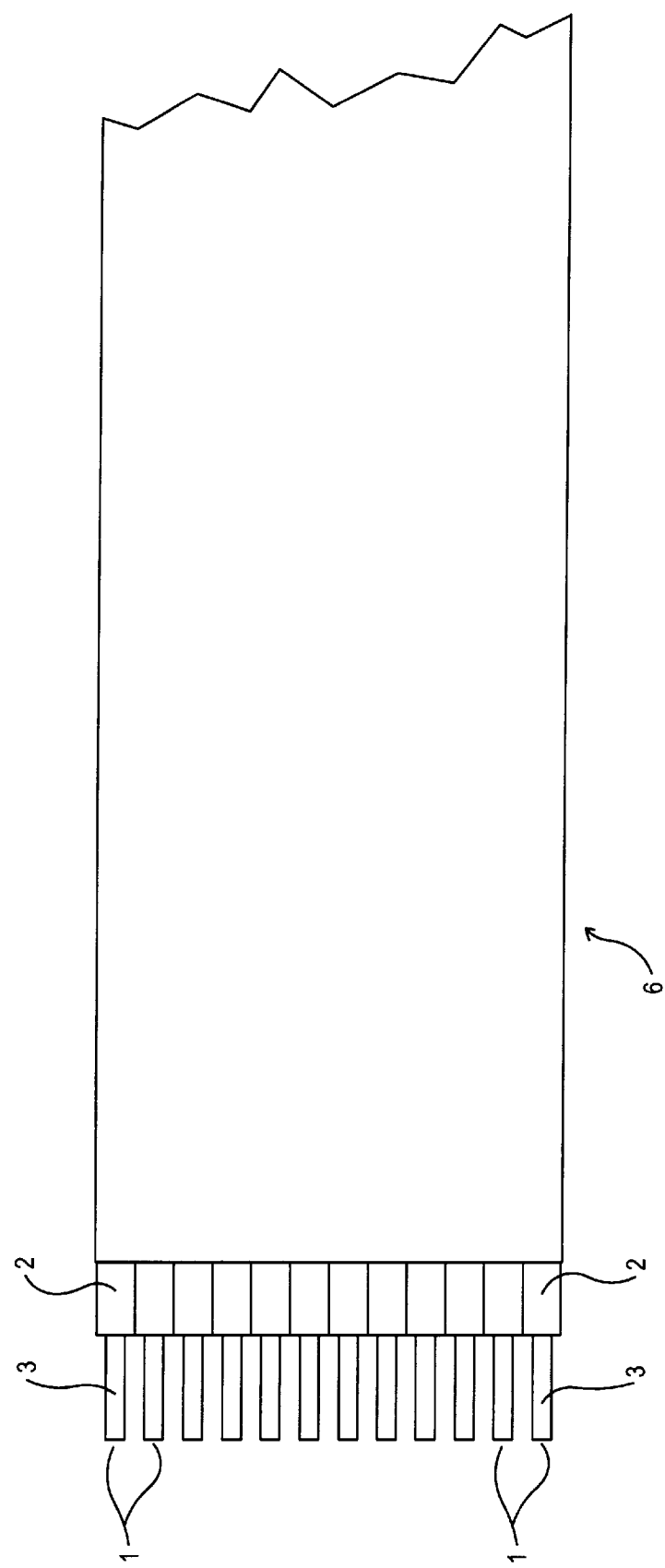
FIG. 5 is a partial plan view of a typical ribbon fiberoptic cable.

After a reference guide pin 12-1 is loaded into the guide pin hole 40 of an MT connector 35, or a reference guide pin 12-2 is loaded into the guide pin hole 40 of an MPO connector 350, the connector is mounted in fixed relationship to interferometer 45 by means of XYZ tip and tilt stage 42 in such a way that the endface, e.g., 13A of reference guide pin 12-1, lies approximately on the optical axis 19 of interferometer 45 and can be viewed by interferometer 45 generally as indicated in FIG. 16A. Tilt stage 42 in FIGS. 16C and 16D is somewhat similar to the fiberoptic connector holding fixture shown in FIG. 3 of my above mentioned U.S. Pat. No. 5,459,564, and is suitable for holding an MT connector 35 or an MPO connector 350 securely during measurement.

The structure of interferometer 45 can be understood by reference to FIG. 16D, which shows a CCD camera 66 controlled by a known control circuit. CCD camera 66 receives an interferogram along the "folded" interferometer optical axis through a power zoom lens 67. The interferogram is produced by interference between an image beam from a light emitting diode 65 impinging on the endface to be profiled and a corresponding reference beam reflected from a reference mirror 69. The video output signal produced by CCD camera 66 then is digitized and processed in accordance with conventional phase shifting interferometry techniques, to compute the three-dimensional profile of the endface, to indicate if the endface has been sufficiently precisely polished to ensure low loss, and low back reflection mating of the MT or MPO connector with a "like" connector. (The term "like" connector as used herein refers to a fiberoptic connector which has an ideal or perfect endface and is mateable with the fiberoptic connector being profiled.)

As shown in FIG. 16C, XYZ tip and tilt stage 42 holds MPO connector 350 (or an MT connector 35) securely during the interferometric measurement. The position and orientation of the connector, MPO connector 350 in this example, is adjusted, either manually or automatically, in the X, Y and Z directions as necessary to ensure that interferometer 45 is focused on the interferometric image of the precisely polished right angled endface 14A of a reference guide pin 12-2 in MPO connector 350.

Referring to FIGS. 16C and 16D, XYZ tip and tilt stage 42 is supported on a base 54 rigidly attached to the base of interferometer 45. Tilt stage 42 includes a vertical support member 53 rigidly attached to base 54. In XYZ tip and tilt stage 42, either an MT connector or an MPO connector is fastened by a clamp 42A in alignment with interferometer optical axis 19. In FIGS. 16C and 16D, MPO connector 350 is shown, attached by clamp 42A to tip stage 60. Tip stage 60 is attached to and supported by tilt stage 59. Tip stage 60 can be adjusted to provide precisely controlled amounts of "tip" about the Y axis. Tilt stage 59 provides precisely controlled amounts of tilt about the X axis. Tilt stage 59 is attached to and supported by X translation stage 58, which in turn is attached to and supported by Z translation stage 56. Z translation stage 56 is attached to Y translation stage 61 using an L-bracket 62. Y translation stage 61 is attached to and supported by vertical support 53.

Referring to FIGS. 16C and 16D, according to the "first method" of the present invention, XYZ tip and tilt stage 42 with an MT connector 35 with a reference guide pin 12-1 loaded therein is "tipped" slightly about the X coordinate axis using tip stage 60 and/or "tilted" slightly about the Y coordinate axis using tilt stage 59 as necessary to cause only a single large fringe to be produced across the entire right angled endface 13A of reference guide pin 12-1, to thereby "null" endface 13A so it is perpendicular to interferometer optical axis 19. (Note that tilting the reference mirror of interferometer 45 instead of the connector endface also can "null" the connecting endface 35A.)

Then, the X,Y position of XYZ tip and tilt stage 42 is adjusted so interferometer 45 views a fringe pattern across MT connector endface 35A and acquires the interferogram data necessary to compute the profile thereof.

The interferometric profile of endface 35A thus attained is inherently "calibrated" with respect to guide pin hole 40 of MT connector 35, and hence also to the guide pin hole 40 of a like theoretically perfect MT connector 35-1. Therefore, the calibrated profile of endface 35A provides much more accurate information about the overall topography and especially the "highest" point of endface 35A than would be available without the use of the foregoing reference guide pin 12-1 and the foregoing procedure of the present invention, and hence helps predict the performance (such as susceptibility to excessive loss and back reflection) of MT connector 35.

After the interferometric profile has been obtained, reference guide pin 12-1 is removed from MT connector 35 using insertion/removal tool 20 and is held therein for insertion into the next MT connector to be profiled. The present MT connector 35 then is advanced in its normal production path. The sequence of steps used to unload the one or two reference guide pins 12-1 is the reverse of the loading sequence shown in FIGS. 15A–C.

It should be understood that the above mentioned inherent calibration of the profile of connector endface 35A occurs because during the nulling of reference guide pin endface 13A it undergoes exactly the same "tip" and "tilt" angles required to precisely align the reference pin 12-1, and hence guide pin hole 40, with interferometer optical axis 19.

As indicated above, the foregoing method can include use of two rather than one of the precisely polished reference guide pins 12-1 inserted by insertion/removal tool 20 into one or two guide pin holes 40 as shown in FIG. 16B. One would normally expect that after "nulling out" the interferogram fringes on the endface 13A of one reference guide pin 12-1, the endface of the other reference guide pin would also have only one broad fringe across its endface 13A. In the event that it does not, one would have learned and been able to quantify the amount by which the two guide pin holes are not parallel with respect to each other.

Figure 19:
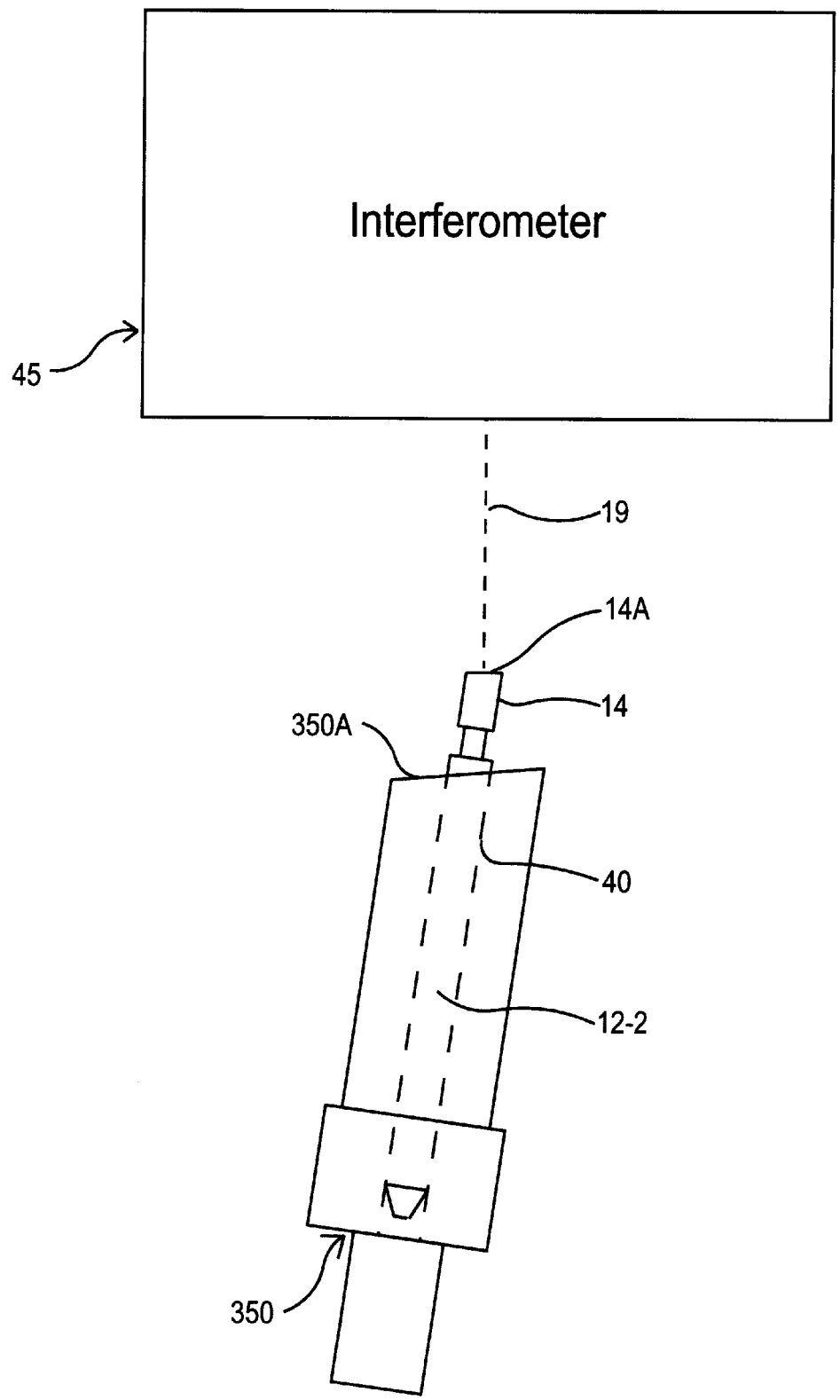
FIG. 19 is a diagram useful in explaining interferometric profiling of the endface of an MPO connector.

FIG. 19 indicates how the "first method" of the present invention also can be performed to obtain a "calibrated" profile of the angled endface 350A of an MPO connector 350. First, interferometer 45 is focused onto the flat, polished angled endface 14A of a reference guide pin 12-2 as shown in FIG. 13C. As previously explained, the keying feature 14B mates with a complementary keying feature in the recesses 49 of jaws 26 and 27 of insertion/removal tool 20 so that reference pin endface 14A is substantially parallel to MPO connector endface 350A. The MPO connector 350 then is tipped and tilted to "null" reference guide pin endface 14A so it is perpendicular to optical axis 19 of interferometer 45. Then interferometer 45 is focused on MPO connector endface 350A, and the resulting interferogram data is acquired by interferometer 45. Interferometer 45 then computes the profile of connector endface 350A, which profile is precisely calibrated relative to reference pin endface 14A, hence to guide pin hole 40 (and hence the precisely angled endface of a theoretically perfect mating MPO connector 350-1 (FIG. 7)).

According to either of the "first method" or a subsequently described "second method" of the present invention, the precisely polished endface of the reference guide pin is inclined or "angled" so as to have a known angle, for example 8 degrees from a plane perpendicular to the longitudinal axis of reference guide pin 12-2, for use in conjunction with an MPO connector, or zero degrees from a plane perpendicular to the longitudinal axis of a reference guide pin 12-1 for use in conjunction with an MT connector. (Those skilled in the art know that 8 degrees is the accepted angular connector endface offset angle used in high performance fiberoptic connectors to minimize the effects of back-reflection. This 8 degree offset angle of the endface 350A of an MPO fiberoptic connector 350 results in most of the back-reflection not being transmitted back down the fiber to the transmission equipment; the back reflection therefore causes very little adverse effect on system performance. Note that some manufacturers use endface offset angles different than 8 degrees, in which case reference guide pins could be manufactured with such different endface offset angle.)

Figure 17:
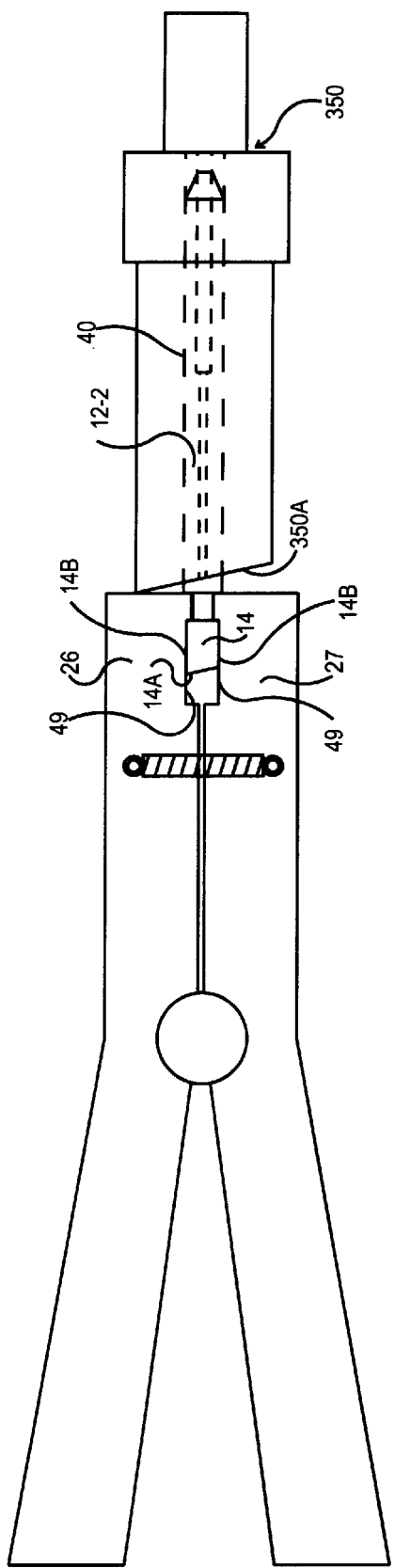
FIG. 17 is an elevation view illustrating using the tool of FIGS. 14A and 14B to load the reference guide pin of FIG. 13B or 13C into guide pin holes of an MT or MPO connector.

Reference guide pin 12-2 of FIG. 13C and insertion/removal tool 20 can include keying features to ensure that the rotational orientation of the 8 degree angled endface 14A is established and maintained as reference guide pin 12-2 is being inserted into guide hole 40 of MPO connector 350 such that angled endface 14A is approximately parallel to endface 350A of MPO connector 350, as shown in FIG. 17. The keying can be achieved by introducing a suitable keying feature 14B onto head 14 of reference guide pin 12-2 and a complementary keying feature on the surfaces of recesses 49 in jaws 26 and 27 of insertion/removal tool 20. Jaws 26 and 27 grip head 14 of reference guide pin 12-2, and the keying features in recess 49 line up with matching keying features 14B to orient head 14 so that reference guide pin endface 14A is approximately parallel to MPO connector endface 350A. (Note that even for MT connector 35, it may be useful to maintain a known rotational orientation for the reference guide pins, to improve measurement repeatability, so it makes sense to use the foregoing rotational keying arrangement 14B on the reference guide pins 12-1 used for MT connectors. The same reference guide pin insertion/removal tool 20 then can be used for insertion/removal of reference guide pins for both MT and MPO connectors.)

It should be understood that the fringe density viewed by interferometer 45 on poorly polished endfaces during the above described "first method" may not be viable, i.e., may be too high for interferometer 45 to accurately interpret over the large endface area. This is the case because the MT and MPO connectors manufactured by some companies have a very poor polish on their endfaces, due to the unavailability of any practical way of accurately profiling the endfaces of such connectors.

Figure 6:
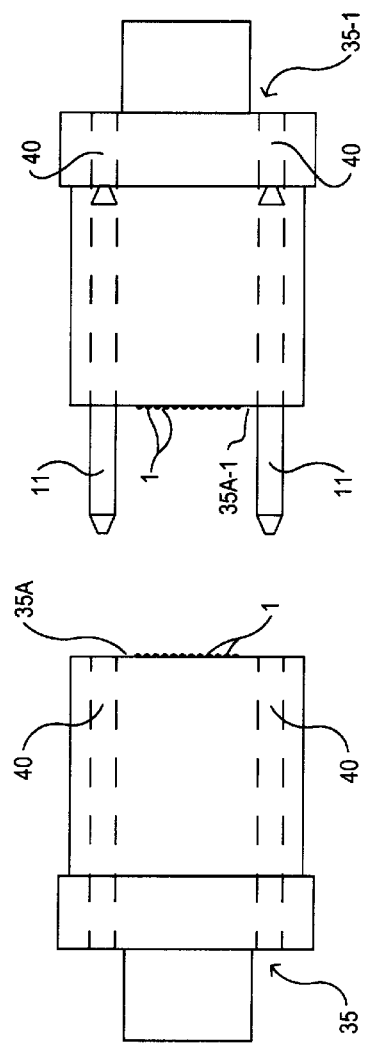
FIG. 6 is a plan view of two MT connectors aligned to be joined or mated.
Figure 7:
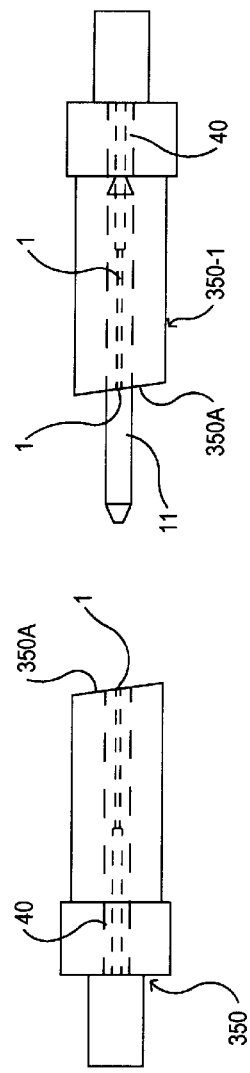
FIG. 7 is a side view of two MPO connectors aligned to be mated.
Figure 8:
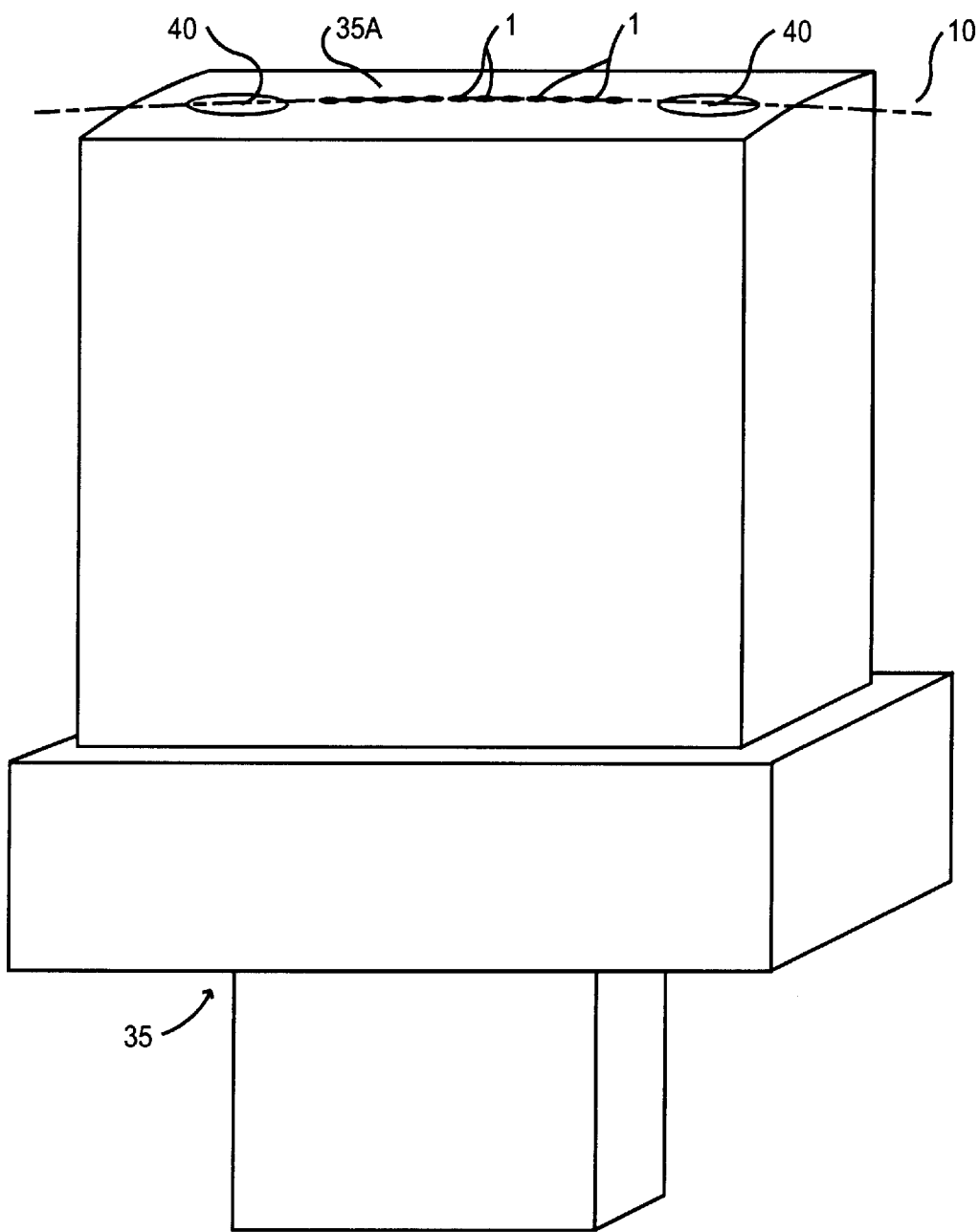
FIG. 8 is a perspective view of an MT connector with a slightly convex endface.
Figure 9:
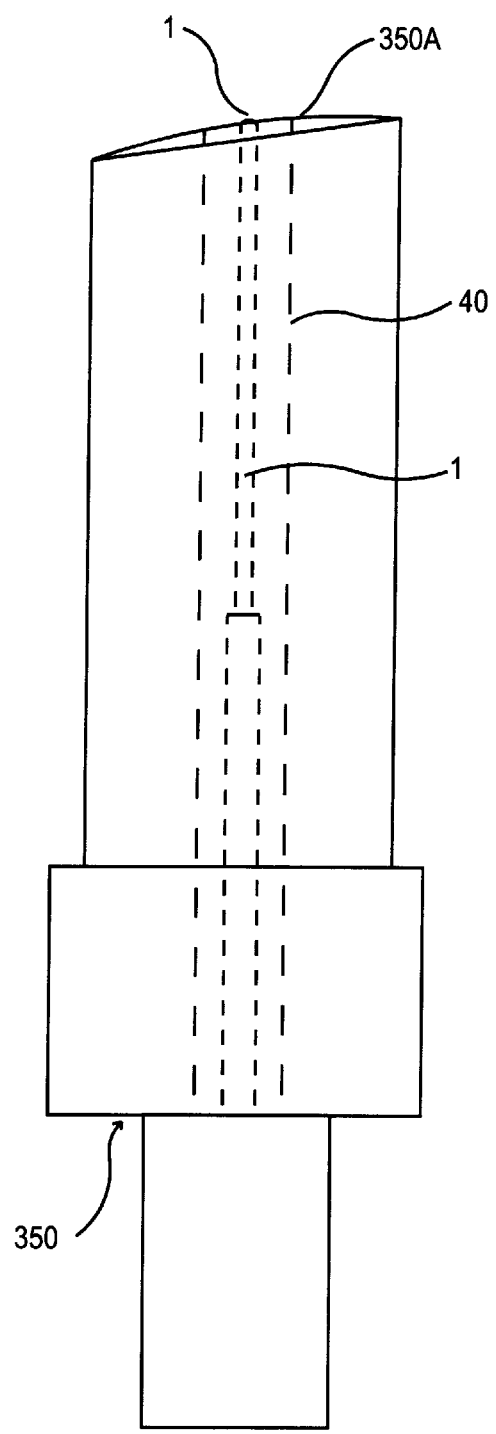
FIG. 9 is a side view of an MPO connector with a slightly convex endface polish.
Figure 10A:
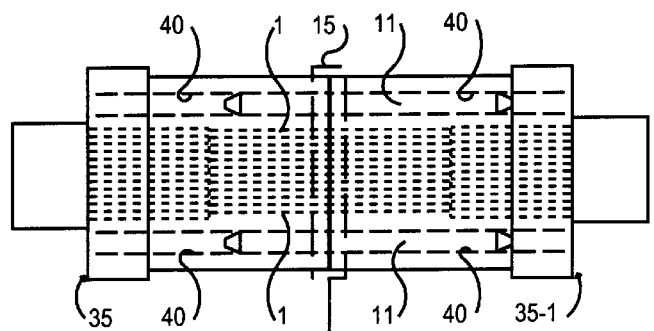
FIG. 10A is a plan view of a pair of precisely mated MT connectors.
Figure 10B:
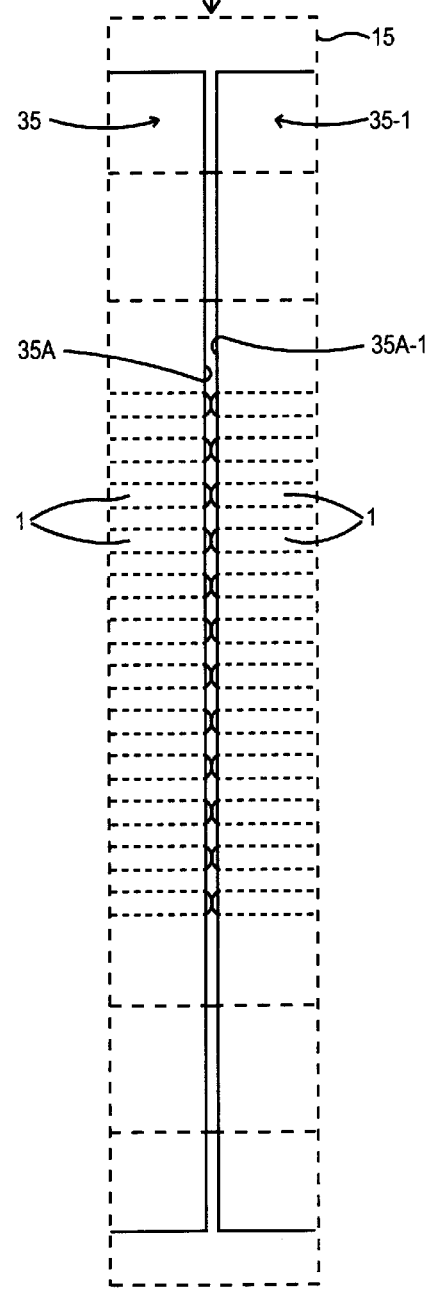
FIG. 10B is an enlarged view of feature 15 of FIG. 10A.
Figure 11A:
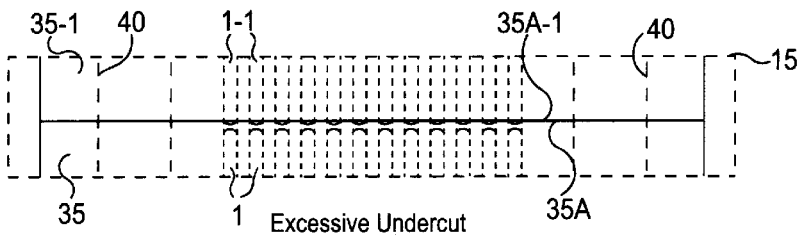
FIG. 11A shows feature 15 of FIG. 10B with an excessive undercut of the fiber ends of the lower connector so as to prevent ends of corresponding fibers from achieving physical contact.
Figure 11B:
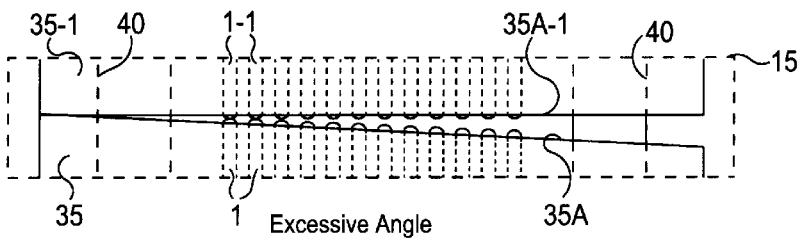
FIG. 11B shows feature 15 of FIG. 10B with an excessive endface polish angle of the lower connector preventing the ends of some of the corresponding fibers from achieving physical contact.
Figure 11C:
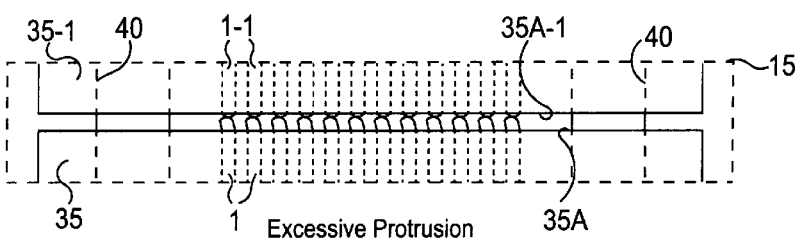
FIG. 11C shows feature 15 of FIG. 10B with excessive protrusion of the fiber ends from the endface of the lower connector, resulting in fiber stress, poor fiber coupling and potential fiber damage.
Figure 11D:
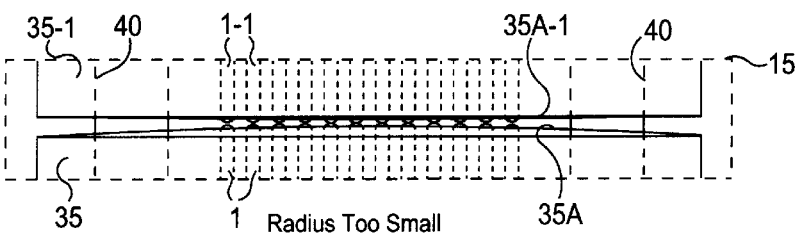
FIG. 11D shows feature 15 of FIG. 10B wherein the endface of the lower connector is too convex, preventing the ends of corresponding outermost fibers from achieving physical contact.
Figure 12:
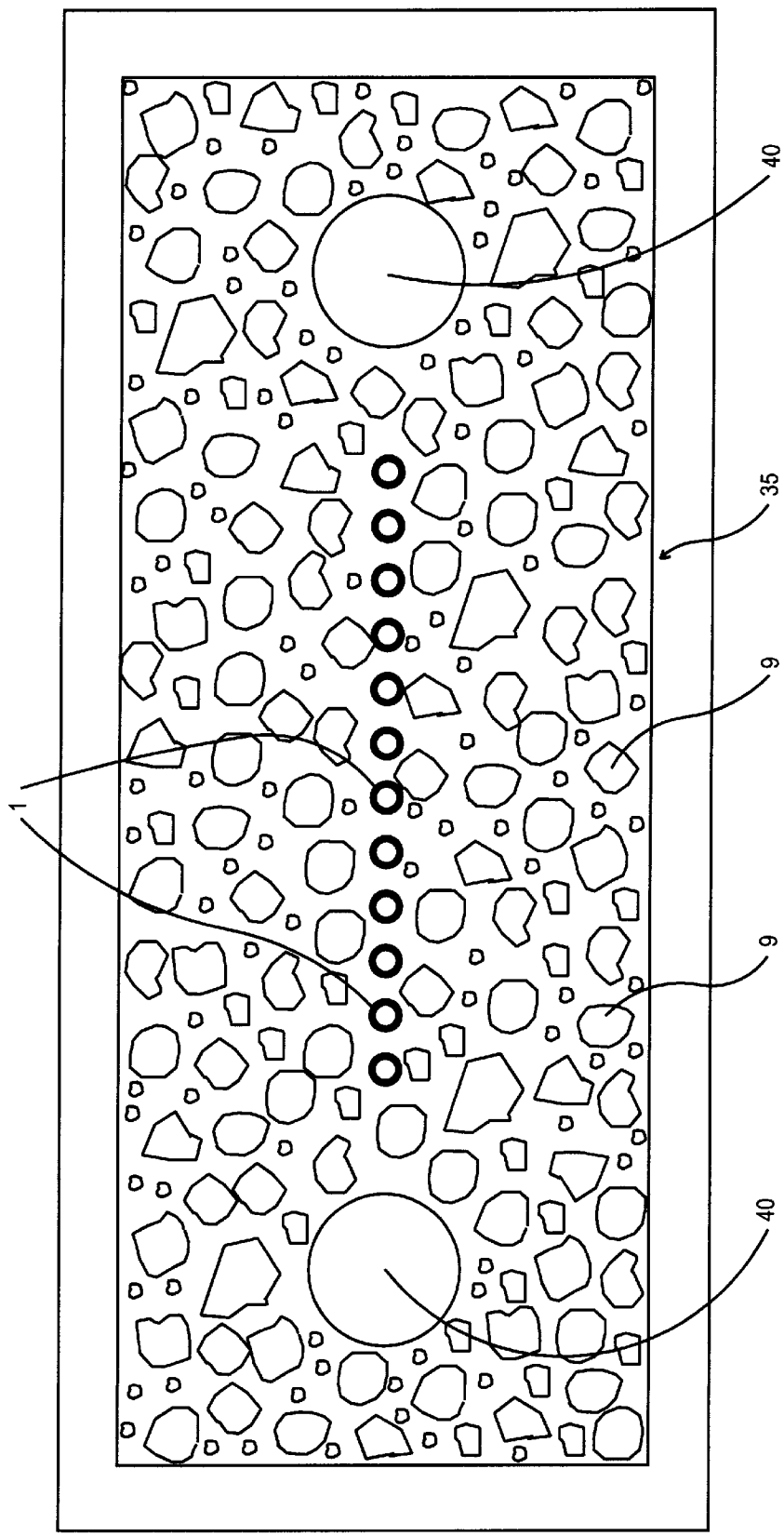
FIG. 12 shows silica islands in a "sea of epoxy" on the endface of a typical MT or MPO connector.

The foregoing problem of unacceptably high connector endface fringe density as viewed by interferometer 45 on a poorly polished connector endface using the "first method" can be solved according to the "second method" of the invention. This is accomplished by first focusing interferometer 45 on the poorly polished MT or MPO connector endface instead of on the precisely polished reference guide pin endface as in the "first method", and by "nulling" the interferogram on the connector endface by adjusting the orientation of the connector endface (relative to the reference mirror of interferometer 45) to minimize the fringe density. At the same time, the interferogram data needed to compute the "uncalibrated" profile of the connector endface is acquired from the "nulled" connector endface. Then interferometer 45 is focused on the reference pin endface, and its profile is measured. Then the profile of the reference pin endface relative to interferometer optical axis 19 is computed. The profiles of the reference pin endface and the connector endface are combined or utilized to compute a "calibrated" connector endface profile that is calibrated and referenced to guide pin hole 40 of the MPO connector, and hence to the guide pin hole 40 of a theoretically perfect mating connector as shown in FIGS. 6 and 7.

Figure 18:
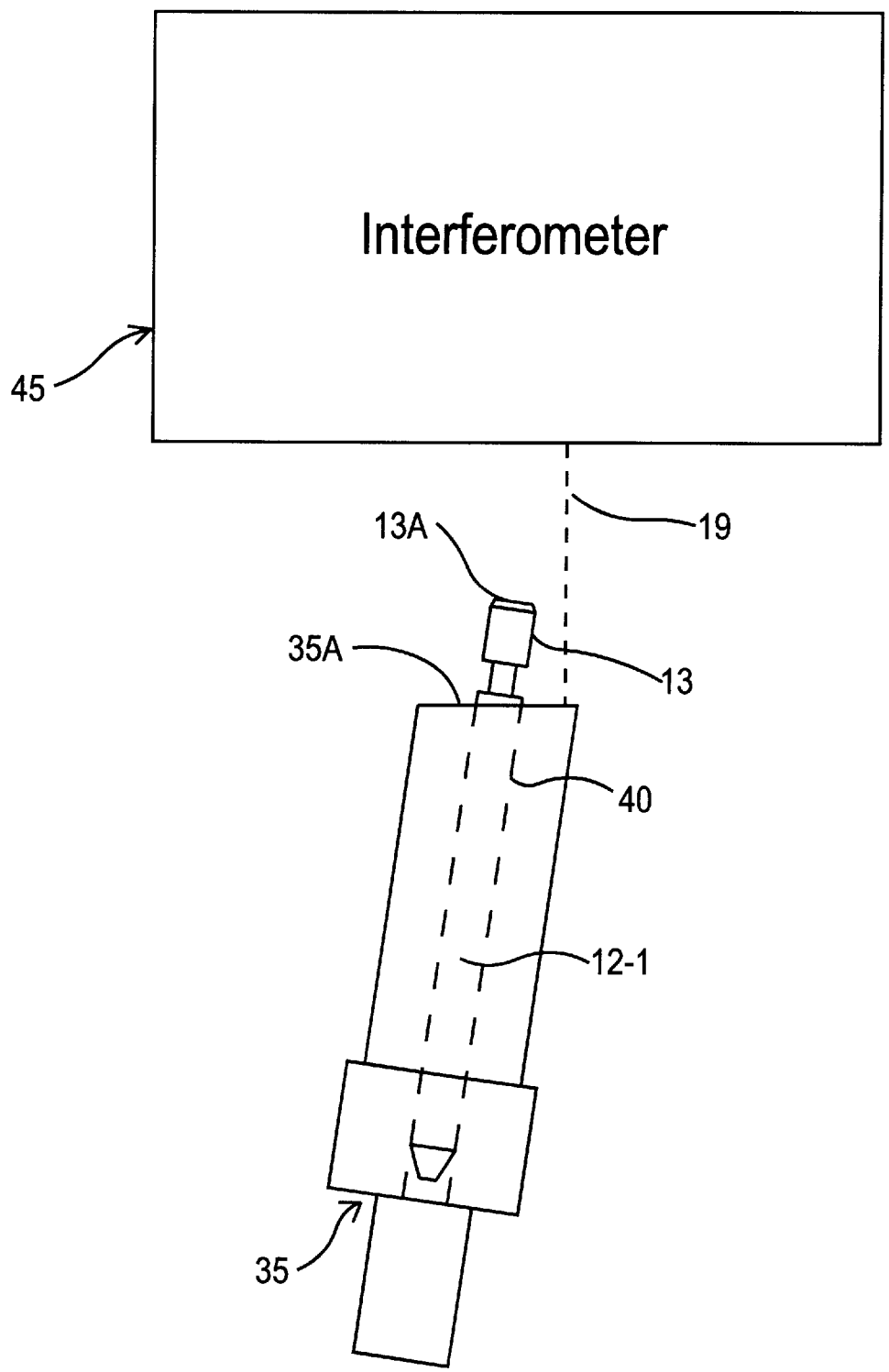
FIG. 18 is a diagram useful in explaining interferometric profiling of the endface of an MT connector.

For example, in one implementation of the "second method" the connector is an MT connector 35 as shown in FIG. 18 (wherein the non-perpendicular "error" angle of endface 35A is exaggerated for the purpose of illustration). Interferometer 45 is focused on connector endface 35A, which is "nulled" by adjusting the orientation of the connector endface relative to the reference mirror of interferometer 45 to minimize the fringe density on connector endface 35A. The interferogram data necessary to compute the profile of connector endface 35 then is acquired by interferometer 45. Interferometer 45 then is focused on reference pin endface 13A, which necessarily was tipped and tilted the same amount as connector endface 35A to accomplish the above nulling. Although a large number of fringes may appear on reference pin endface 13A, its small surface area presents a relatively small scan range for interferometer 45. The interferometer 45 then is operated to accurately acquire the interferogram data representing all of the fringes on reference guide pin endface 13A and then compute the profile of reference guide pin endface 13A, which profile includes the tip and tilt angles (relative to guide pin hole 40) needed to null connector endface 35A. Consequently, the calibrated profile computed for connector endface 35A can be easily obtained by combining the two profiles. The calibrated profile of connector endface 35A referenced to guide pin hole 40 then accurately indicates which point of connector endface 35A will first contact the connector endface of a theoretically perfect mating MT connector.

Figure 20:
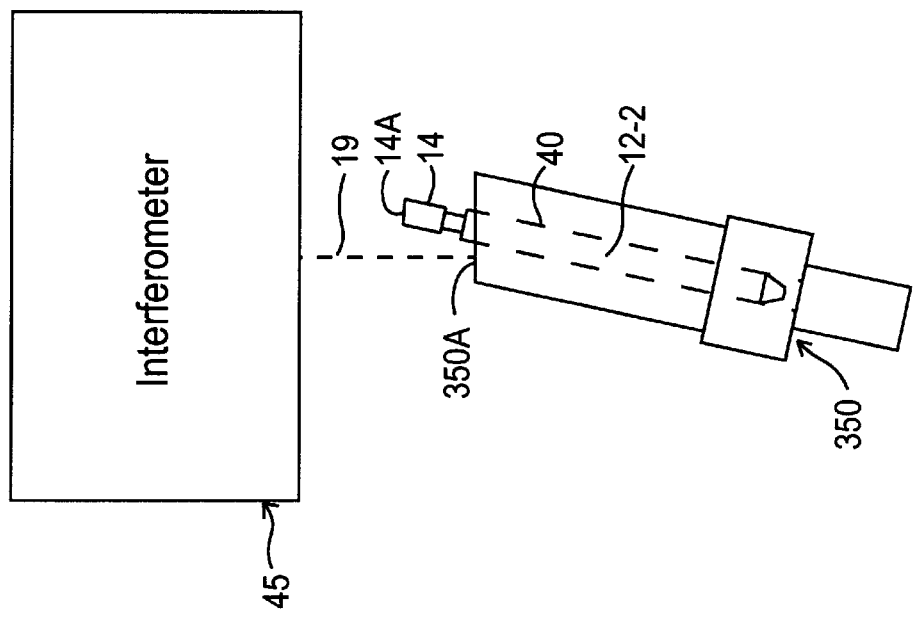
FIG. 20 is a diagram useful in explaining interferometric profiling of the endface of an MPO connector.

The "second method" of the present invention also can be utilized as indicated in FIG. 20, wherein interferometer 45 initially is focused onto an MPO connector endface 350A. The XYZ tip and tilt stage 42 is then tipped or tilted about the X and/or Y axes, respectively, to "null" connector endface 350A, i.e., to minimize the fringe density thereon. The interferogram data representing the profile of the "nulled" connector endface 350A then is acquired by interferometer 45, which uses that data to compute the "uncalibrated" profile of connector endface 350A. Then, without changing the orientation of clamping fixture 42 and MPO connector 350, interferometer 45 is focused on endface 14A of reference pin 12-2. Interferometer 45 then acquires data representing the interferogram of flat-angled, polished reference pin endface 14A, which represents the amount of the foregoing tip and/or tilt relative to guide pin hole 40 which was required to null connector endface 350A, and uses that data to compute the profile of reference guide pin endface 14A. The profile of reference guide pin endface 14A thus is effectively subtracted from or combined with the uncalibrated profile of connector endface 350A to provide a calibrated profile of MPO connector endface 350A that is precisely referenced to guide pin hole 40 of MPO connector 350 and hence to the reference guide pin hole of a mating theoretically perfect MPO connector (FIG. 7). The reducing of the scan range as explained above significantly reduces the amount of time for the MPO endface profile measurement.

It should be understood that although it would be possible to "null" endface 350A before acquiring the interferogram data without the use of reference guide pin 12-2, it would not be possible to calculate the amount of tip and tilt about the Y axis and X axis, respectively, that was required in order to accomplish the nulling, because the number of fringes representing such tip and tilt amounts would not have been "transferred" to another surface. Therefore, even though the necessary interferogram data could be acquired without use of reference guide pin 12-2, the resulting connector endface profile could not be referenced or calibrated with respect to a theoretically perfect mating MPO connector.

The interferometric image of the precisely polished reference guide pin endface 14A then includes tilt information representative of how much MPO connector endface 350A had to be tipped and/or tilted about the X and Y axes in order to reduce the fringe density on MPO connector endface 350A to a suitable i.e.,viable level. Since the amount of tip and tilt can be exactly quantified and broken down into each of its two tip and tilt angle components about the X and Y axes, respectively, the interferometric image of MPO connector endface 350A then can be corrected by the tip and tilt information transferred to the reference guide pin endface 14A, allowing accurate computation of the actual profile of the endface 350A that will be presented to a theoretically perfect mating MPO connector. The profile of MPO connector endface 350A therefore provides much more accurate information about the susceptibility of the MPO connector to loss and back-reflection than otherwise would be available from use of prior techniques.

After the profile of MPO connector endface 350A has been completed, the reference guide pin(s) 12-2 is removed and held for the next connector to be profiled, using insertion/removal tool 20.

It should be understood that in accordance with the "second method" of the invention, the fringe density problem is eliminated by effectively "transferring" the same fringe density from a large, irregular, lower quality connector endface to the much smaller, highly polished, and reflective reference guide pin endface.

Consequently, non-viable fringe densities that would have been difficult or impossible to interpret on a poorly polished MT connector endface 35A or on a poorly polished MPO connector endface 350A using the "first method" can be readily interpreted once transferred onto the reference guide pin endface 13A or 14A, respectively. When this "tip and tilt angle transferring" technique is used in conjunction with a Zoom Interferometer, such as the present assignee's Direct Optical Research ZX-1 Zoom Interferometer, which has the ability to change the field of view without interferometric re-calibration, the invention becomes even more useful. That interferometer is illustrated in FIG. 16D, and is further described in detail in my above referenced U.S. Pat. No. 5,459,564). In this case, even if the fringe density transferred to the reference guide pin endface is still too high to measure, this type of interferometer could zoom in as necessary when measuring the reference guide pin, effectively reducing the field of view until a viable fringe density is reached, and thereby still permit error correction of the connector endface profile, and thereby still provide a calibrated measurement.

The foregoing technique and structure is more suited to, but not limited to, incorporation by automated measurement systems, due to the fact that the MT or MPO connector endface interferogram at the time of the measurement does not directly represent the calibrated surface topography of the connector, as it will be presented to a theoretically perfect mating connector. By the end of the measurement sequence the error, which is effectively transferred to the reference guide pin is compensated for, which results in an accurately calibrated measurement.

It should be appreciated that the only way to meaningfully reduce the fringe density across the connector endface or guide pin endface is to precisely tip and tilt each individual connector to be measured with respect to the interferometer's optical axis until a viable fringe density is reached. Without using one of the reference guide pin methods described above, the connector endface profile cannot be meanfully calibrated relative to the endface of a theoretically perfect mating connector, and therefore the connector performance is not accurately determinable.

The above described embodiments of the invention provide the advantages of calibrated rather than relative measurement of the connector endface geometry, thus enabling the operator and/or interferometer to more accurately predict the expected performance of the connector. The "tip and tilt angle transfer" method of FIGS. 18 and 20 can additionally reduce the scan range required to acquire the surface data, while maintaining an accurate measurement. For example, even if a sample connector endface is flat but tilted at an angle with respect to the interferometer axis, a large scan range is required. By nulling out on the polished connector endface, the angle is effectively transferred to the polished endface of the reference guide pin 12-1 or 12-2. Since the endface of the reference guide pin has much smaller lateral dimensions than the connector endface itself, the scan range can be reduced. Since the reference guide pin endface needs to be qualified only once the reference guide pin endfaces can even be measured using red rather than white light, which further reduces the overall required scan range, and significantly increases measurement speed.

All of the methods described above provide the additional advantage of allowing accurate measurement of fiberoptic connectors, even with their housings installed; this has been impossible previously because insufficient amounts of the connector's endfaces protrude from the housing to allow for repeatable fixturing (which is essential for repeatable measurements even if the measurement is not calibrated by use of the present invention). In contrast, the invention eliminates the need for repeatable fixturing to obtain repeatable connector endface profiles; instead, the measurement fixture just has to be rigid and stable enough to hold the connector steady for the duration of the interferometric measurement.

Figure 21:
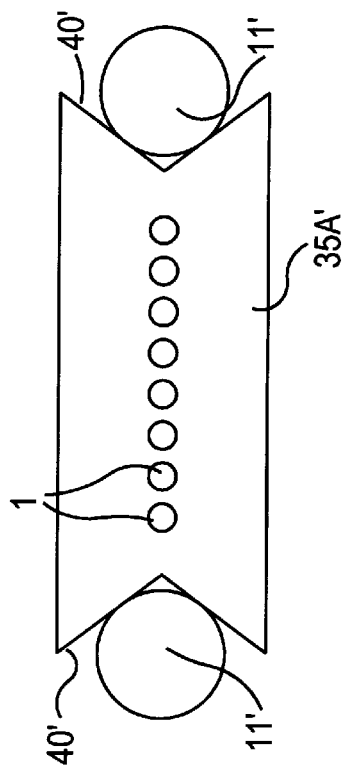
FIG. 21 is a section view diagram useful in describing an alternative embodiment of the invention.

While the invention has been described with reference to several particular embodiments thereof, those skilled in the art will be able to make the various modifications to the described embodiments of the invention without departing from the true spirit and scope of the invention. It is intended that all elements or steps which are insubstantially different or perform substantially the same function in substantially the same way to achieve the same result as what is claimed are within the scope of the invention. For example, one connector could be provided with two rigidly attached reference guide pins 11' which slide into corresponding edge grooves 40' rather than the guide pin holes of a mating connector, as shown in FIG. 21.

Although the foregoing methods have relied on the use of precisely flat polished "reference guide pins", it would be possible, but not preferable, to achieve the objective of accurate calibration by using reference guide pins having a wide variety of endface profiles, providing that the exact endface angle, radius or shape is known. Examples of surfaces that can be fairly easily used to meet the objective include angled flats, radiuses or parabolic endfaces. Use of any reference guide pin endface profile other than a precisely flat endface profile would necessitate either rotation of the reference guide pin to at least two positions (preferably ninety degrees apart) or the use of both reference guide pins, each one having a known endface profile. Numerous other reference guide pin insertion/removal tools could be designed and used.

What is claimed is:

1. A method of evaluating a connector end surface of a multi-fiber connector having a precision guide pin hole for receiving a guide pin to precisely mate the multi-fiber connector with a like multi-fiber connector, the method comprising:
   (a) providing a reference guide pin having on one end thereof a polished reference surface oriented at a predetermined angle relative to a longitudinal axis of the reference guide pin;
   (b) inserting the reference guide pin into the guide pin hole;
   (c) focusing an interferometer on the reference surface to produce an interferogram of the reference surface;
   (d) adjusting the relative orientation between the reference surface and a reference mirror of the interferometer as necessary to produce a predetermined fringe density of the interferogram of the reference surface;
   (e) ensuring that the interferometer is focused on the connector end surface; and
   (f) operating the interferometer to acquire data representative of an interferogram of the connector end surface and operating the interferometer to compute from the data a profile of the connector end surface, wherein the profile is precisely calibrated with reference to the guide pin hole, whereby the profile of the connector end surface is indicative of mateability of the multi-fiber connector with the like multi-fiber connector.

2. The method of claim 1, wherein step (b) includes using an insertion/removal tool to grip the reference guide pin and then insert the reference guide pin into the guide pin hole to a predetermined depth.

3. The method of claim 2, including using the insertion/removal tool to remove and hold the reference guide pin after step (f).

4. The method of claim 1, wherein the predetermined angle is a right angle.

5. The method of claim 1, wherein the predetermined angle is an acute angle.

6. The method of claim 5, wherein the acute angle is approximately 8 degrees.

7. The method of claim 5, wherein the acute angle is approximately equal to an angle of the connector end surface relative to the longitudinal axis of the reference guide pin when it is in the guide pin hole.

8. The method of claim 7, wherein step (b) includes rotationally orienting the reference guide pin about its longitudinal axis so that the reference surface is approximately parallel to the connector end surface.

9. The method of claim 1 wherein step (b) includes inserting the reference guide pin a predetermined depth into the guide pin hole.

10. The method of claim 1 wherein the predetermined fringe density is a minimum obtainable fringe density.

11. The method of claim 1 wherein the polished reference surface is flat.

12. The method of claim 1 including providing a zoom lens in the interferometer, and wherein step (f) includes determining if the interferogram of the connector end surface includes too many fringes, and if so, operating the zoom lens to provide a field of view of the connector end surface which includes only a reduced portion of the connector end surface and hence a reduced density of fringes, before computing the profile of the connector end surface.

13. The method of claim 1 wherein the ensuring of step (e) includes focusing the interferometer on the connector end surface if the connector end surface is not flush with the reference surface of the reference guide pin.

14. The method of claim 1 wherein the ensuring of step (e) includes maintaining the focus of the interferometer as established in step (c) if the reference surface of the reference guide pin is flush with the connector end surface.

15. A method of evaluating a connector end surface of a multi-fiber connector having a precision guide pin hole for receiving a guide pin to precisely mate the multi-fiber connector with a like multi-fiber connector, the method comprising:
   (a) providing a reference guide pin having on one end thereof a polished reference surface oriented at a predetermined angle relative to a longitudinal axis of the reference guide pin;
   (b) inserting the reference guide pin into the guide pin hole;
   (c) focusing an interferometer on the connector end surface;
   (d) adjusting the relative orientation between the connector end surface and a reference mirror of the interferometer as necessary to produce a predetermined fringe density of an interferogram of the connector end surface, and then operating the interferometer to acquire data from the interferogram of the connector end surface, and then operating the interferometer to produce from that data an uncalibrated profile of the connector end surface;
   (e) ensuring that the interferometer is focused on the reference surface;
   (f) operating the interferometer to acquire data representative of an interferogram on the reference surface, and operating the interferometer to compute from that data a profile of the reference surface; and
   (g) operating the interferometer to utilize the profiles of the connector end surface and the reference surface to precisely calibrate the connector end surface relative to the guide pin hole to provide a calibrated profile of the connector end surface, whereby the calibrated profile of the connector end surface is indicative of mateability of the multi-fiber connector with the like multi-fiber connector.

16. The method of claim 15, wherein step (b) includes using an insertion/removal tool to grip the reference guide pin and then insert the reference guide pin into the guide pin hole to a predetermined depth.

17. The method of claim 16, including using the insertion/removal tool to remove and hold the reference guide pin after step (g).

18. The method of claim 15, wherein the predetermined angle is a right angle.

19. The method of claim 15, wherein the predetermined angle is an acute angle.

20. The method of claim 19, wherein the acute angle is approximately 8 degrees.

21. The method of claim 19, wherein the acute angle is approximately equal to an angle of the connector end surface relative to the longitudinal axis of the reference guide pin when it is in the guide pin hole.

22. The method of claim 21, where step (b) includes rotationally orienting the reference guide pin about its longitudinal axis so that the reference surface is approximately parallel to the connector end surface.

23. The method of claim 15 wherein step (b) includes inserting the reference guide pin a predetermined depth into the guide pin hole.

24. The method of claim 15 wherein the predetermined fringe density is a minimum obtainable fringe density.

25. The method of claim 15 wherein the polished reference surface is flat.

26. The method of claim 15 including providing a zoom lens in the interferometer, wherein step (f) includes determining if the interferogram of the reference surface includes too many fringes, and if so, operating the zoom lens to provide a field of view of the reference surface which includes only a reduced portion of the reference surface and hence a reduced density of fringes, before computing the profile of the reference surface.

27. A system for evaluating a connector end surface of a multi-fiber connector having a precision guide pin hole for receiving a guide pin to precisely mate the multi-fiber connector with a like multi-fiber connector, comprising:

(a) means for providing a reference guide pin having on one end thereof a polished reference surface oriented at a predetermined angle relative to a longitudinal axis of the reference guide pin;

(b) means for inserting the reference guide pin a predetermined depth into the guide pin hole;

(c) means for focusing an interferometer on the reference surface to produce an interferogram of the reference surface;

(d) means for adjusting the relative orientation between the reference surface and a reference mirror of the interfecrometer to produce a predetermined fringe density of the interferogram of the reference surface;

(e) means for focusing the interferometer on the connector end surface; and (f) means for operating the interferometer to acquire data representative of an interferogram of the connector end surface and operating the interferometer to compute from the data a profile of the connector end surface, wherein the profile is precisely calibrated with reference to the guide pin hole, whereby the profile of the connector end surface is indicative of mateability of the multi-fiber connector with the like multi-fiber connector.

28. A system for evaluating a connector end surface of a multi-fiber connector having a precision guide pin hole for receiving a guide pin to precisely mate the multi-fiber connector with a like multi-fiber connector, comprising:

(a) means for providing a reference guide pin having on one end thereof a polished reference surface oriented at a predetermined angle relative to a longitudinal axis of the reference guide pin;

(b) means for inserting the reference guide pin into the guide pin hole;

(c) means for focusing an interferometer on the connector end surface;

(d) means for adjusting the relative orientation between the connector end surface and a reference mirror of the interferometer to produce a predetermined fringe density of an interferogram of the connector end surface, and then operating the interferometer to acquire data from the interferogram on the connector end surface, and then operating the interferometer to produce from that data an uncalibrated profile of the connector end surface;

(e) means for focusing the interferometer on the reference surface;

(f) means for operating the interferometer to acquire data representative of an interferogram of the reference surface, and operating the interferometer to compute from that data a profile of the reference surface; and (g) means for operating the interferometer to utilize the profiles of the connector end surface and the reference surface to precisely calibrate the connector end surface relative to the guide pin hole to provide a calibrated profile of the connector end surface, whereby the calibrated profile of the connector end surface is indicative of mateability of the multi-fiber connector with the like multi-fiber connector.

29. Apparatus for evaluating a connector end surface of a multi-fiber connector having a precision guide pin hole for receiving a guide pin to precisely mate the multi-fiber connector with a like multi-fiber connector, comprising:

(a) a reference guide pin having on one end thereof a polished reference surface oriented at a predetermined angle relative to a longitudinal axis of the reference guide pin;

(b) an insertion tool adapted to grip the reference guide pin and insert the reference guide pin a predetermined depth into the guide pin hole of the multi-fiber connector;

(c) an interferometer including an adjustment feature adapted to adjust the relative orientation between the reference surface and a reference mirror of the interferometer allow the interferometer to produce a predetermined fringe density of an interferogram of the reference surface, the interferometer also including a focusing feature adapted to focus the interferometer on the connector end surface to allow the interferometer to acquire data representative of an interferogram of the connector end surface and operating the interferometer to compute from the data a profile of the connector end surface, wherein the profile is precisely calibrated with reference to the guide pin hole, whereby the profile of the connector end surface is indicative of mateability of the multi-fiber connector with the like multi-fiber connector.

30. Apparatus for evaluating a connector end surface of a multi-fiber connector having a precision guide pin hole for receiving a guide pin to precisely mate the multi-fiber connector with a like multi-fiber connector, comprising:

(a) a reference guide pin having on one end thereof a polished reference surface oriented at a predetermined angle relative to a longitudinal axis of the reference guide pin;

(b) an insertion tool adapted to grip the reference guide pin and insert the reference guide pin a predetermined depth into the guide pin hole of the multi-fiber connector;

(c) an interferometer including an adjustment feature adapted to adjust the relative orientation between the connector end surface and a reference mirror of the interferometer to allow the interferometer to produce a predetermined fringe density of an interferogram of the connector end surface and then acquire data from the interferogram of the connector end surface and produce from that data an uncalibrated profile of the connector end surface, the interferometer including a focusing feature adapted to focus the interferometer on the reference surface to allow the interferometer to acquire data representative of an interferogram of the reference surface and compute from that data a profile of the reference surface, the interferometer including a computing feature adapted to utilize the profiles of the connector end surface and the reference surface to precisely calibrate the connector end surface relative to the guide pin hole to provide a calibrated profile of the connector end surface, whereby the calibrated profile of the connector end surface is indicative of mateability of the multi-fiber connector with the like multi-fiber connector.

31. A method of measuring a connector end surface of a multi-fiber connector having a precision guide pin mating feature for receiving a guide pin to precisely mate the multi-fiber connector with a like multi-fiber connector, the method comprising:

(a) providing a reference guide pin having on one end thereof a polished reference surface oriented at a predetermined angle relative to a longitudinal axis of the reference guide pin;

(b) inserting the reference guide pin a into the guide pin mating feature;

(c) focusing an interferometer on the reference surface to produce an interferogram of the reference surface;

(d) adjusting the relative orientation between the reference surface and a reference mirror of the interferometer as necessary to produce a predetermined fringe density of the interferogram of the reference surface;

(e) focusing the interferometer on the connector end surface; and (f) operating the interferometer to acquire data representative of an interferogram of the connector end surface and operating the interferometer to compute from the data a profile of the connector end surface, wherein the profile is precisely calibrated with reference to the precision guide pin mating feature, whereby the profile of the connector end surface is indicative of mateability of the multi-fiber connector with the like multi-fiber connector.

32. The method of claim 31 wherein the predetermined angle is an acute angle, the method including rotationally orienting the reference guide pin about its longitudinal axis so that the reference surface is approximately parallel to the connector end surface.

33. A method of measuring a connector end surface of a multi-fiber connector having a precision guide pin mating feature for receiving a guide pin to precisely mate the multi-fiber connector with a like multi-fiber connector, the method comprising:

(a) providing a reference guide pin having on one end thereof a polished reference surface oriented at a predetermined angle relative to a longitudinal axis of the reference guide pin;

(b) inserting the reference guide pin a into the guide pin mating feature;

(c) focusing an interferometer on the connector end surface;

(d) adjusting the relative orientation between the connector end surface and a reference mirror of the interferometer to produce a predetermined fringe density of an interferogram of the connector end surface, and then operating the interferometer to acquire data from the interferogram of the connector end surface, and then operating the interferometer to produce from that data an uncalibrated profile of the connector end surface;

(e) ensuring that the interferometer is focused on the reference surface;

(f) operating the interferometer to acquire data representative of an interferogram of the reference surface, and operating the interferometer to compute from that data a profile of the reference surface; and (g) operating the interferometer to utilize the profiles of the connector end surface and the reference surface to precisely calibrate the connector end surface relative to the guide pin mating feature to provide a calibrated profile of the connector end surface, whereby the calibrated profile of the connector end surface is indicative of mateability of the multi-fiber connector with the like multi-fiber connector.

34. The method of claim 33 wherein the predetermined angle is an acute angle, the method including rotationally orienting the reference guide pin about its longitudinal axis so that the reference surface is approximately parallel to the connector end surface.

35. A method of evaluating a connector end surface of a multi-fiber connector having a precision guide pin hole for receiving a guide pin to precisely mate the multi-fiber connector with a like multi-fiber connector, the method comprising:

(a) providing a reference guide pin having on one end thereof a polished reference surface oriented at a predetermined angle relative to a longitudinal axis of the reference guide pin;

(b) inserting the reference guide pin a into the guide pin hole;

(c) focusing an interferometer on the reference surface to produce an interferogram of the reference surface;

(d) adjusting the relative orientation between the reference surface and a reference mirror of the interferometer as necessary to produce a predetermined fringe density of the interferogram of the reference surface;

(e) ensuring that the interferometer is focused on the connector end surface; and (f) operating the interferometer to display an interferogram of the connector end surface, wherein the interferogram is precisely calibrated with reference to the guide pin hole.

36. A method of evaluating a connector end surface of a multi-fiber connector having a precision guide pin hole for receiving a guide pin to precisely mate the multi-fiber connector with a like multi-fiber connector, the method comprising:

(a) providing a reference guide pin having on one end thereof a polished reference surface oriented at a predetermined angle relative to a longitudinal axis of the reference guide pin;

(b) inserting the reference guide pin into the guide pin hole;

(c) focusing an interferometer on the connector end surface;

(d) adjusting the relative orientation between the connector end surface and a reference mirror of the interferometer if necessary to produce a viable fringe density of an interferogram of the connector end surface, and then operating the interferometer to acquire data from the interferogram of the connector end surface, and then operating the interferometer to produce from that data an uncalibrated profile of the connector end surface;

(e) ensuring that the interferometer is focused on the reference surface;

(f) operating the interferometer to acquire data representative of an interferogram of the reference surface if necessary, and operating the interferometer to compute from that data a profile of the reference surface; and (g) operating the interferometer to utilize the profiles of the connector end surface and the reference surface to precisely calibrate the connector end surface relative to the guide pin hole to provide a calibrated profile of the connector end surface, whereby the calibrated profile of the connector end surface is indicative of mateability of the multi-fiber connector with the like multi-fiber connector.

37. The method of claim 36 wherein the ensuring of step (e) includes focusing the interferometer on the reference surface of the reference guide pin if the reference surface of the reference guide pin is not flush with the connector end surface.

38. The method of claim 36 wherein the ensuring of step (e) includes maintaining the focus of the interferometer as established in step (c) if the reference surface of the reference guide pin is flush with the connector end surface.

* * * * *